United States Patent
Rajadurai

(10) Patent No.: US 10,452,861 B2
(45) Date of Patent: Oct. 22, 2019

(54) METHOD, UE AND NETWORK NODE FOR PROTECTING USER PRIVACY IN NETWORKS

(71) Applicant: Samsung Electronics Co., Ltd, Gyeonggi-do (KR)

(72) Inventor: Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 15/344,495

(22) Filed: Nov. 4, 2016

(65) Prior Publication Data
US 2018/0046824 A1   Feb. 15, 2018

(30) Foreign Application Priority Data

Nov. 5, 2015   (IN) ............... 5991/CHE/2015
Sep. 28, 2016  (IN) ............... 5991/CHE/2015

(51) Int. Cl.
*G06F 21/62* (2013.01)
*H04W 12/02* (2009.01)
(Continued)

(52) U.S. Cl.
CPC ...... *G06F 21/6245* (2013.01); *H04L 61/2038* (2013.01); *H04L 61/2092* (2013.01);
(Continued)

(58) Field of Classification Search
CPC .......... G06F 21/6245; H04L 61/6022; H04W 12/08; H04W 84/12
See application file for complete search history.

(56) References Cited

U.S. PATENT DOCUMENTS

| 7,359,989 B2 | 4/2008 | Orava et al. |
| 2007/0155390 A1* | 7/2007 | Kodikara Patabandi ............... H04W 72/1278 455/450 |

(Continued)

FOREIGN PATENT DOCUMENTS

| WO | 2008/020856 A1 | 2/2008 |
| WO | 2014054883 A1 | 4/2014 |
| WO | 2015034193 A1 | 3/2015 |

OTHER PUBLICATIONS

Foreign Communication Related to a Related Counterpart Application, PCT Application No. PCT/KR2016/012649, International Search Report dated Feb. 8, 2017, 3 pages.

(Continued)

*Primary Examiner* — Michael Pyzocha

(57) ABSTRACT

A method for managing privacy of a user in a network includes generating, by a user equipment (UE), a Locally Administered Randomized WLAN MAC Address (LRA), wherein at least one portion of the LRA is randomly generated based on at least one of a network temporary identity and a network parameter. Further, the method includes transmitting, by the UE, the generated LRA to a network node. A User equipment (UE) for managing privacy of a user in a network includes a memory, a processor, coupled to the memory, an LRA generator, coupled to the processor, configured to generate an LRA, wherein at least one portion of the LRA is randomly generated based on at least one of a network temporary identity or a network parameter, and a transceiver, coupled to the processor, configured to transmit the LRA to a network node.

20 Claims, 16 Drawing Sheets

(51) Int. Cl.
  *H04W 12/08* (2009.01)
  *H04L 29/12* (2006.01)
  *H04W 84/12* (2009.01)

(52) U.S. Cl.
  CPC ......... *H04L 61/6022* (2013.01); *H04W 12/02* (2013.01); *H04W 12/08* (2013.01); *H04W 84/12* (2013.01)

(56) References Cited

U.S. PATENT DOCUMENTS

| | | |
|---|---|---|
| 2014/0126504 A1 | 5/2014 | Jung et al. |
| 2014/0204927 A1 | 7/2014 | Horn et al. |
| 2015/0063205 A1* | 3/2015 | Elliott ................. H04L 61/6022 370/328 |
| 2015/0092688 A1* | 4/2015 | Jeong ..................... H04W 8/26 370/329 |
| 2015/0163056 A1* | 6/2015 | Nix ....................... H04L 9/0869 380/46 |
| 2016/0050559 A1* | 2/2016 | Rose ..................... H04W 12/02 370/338 |
| 2016/0198379 A1 | 7/2016 | Cho et al. |
| 2016/0219411 A1* | 7/2016 | Tenant de la Tour .. H04W 4/04 |
| 2017/0013449 A1* | 1/2017 | Raman .................. H04W 12/06 |
| 2017/0245143 A1* | 8/2017 | Lindheimer ............ H04W 8/26 |
| 2017/0264606 A1* | 9/2017 | Forssell ............... H04L 63/0815 |
| 2017/0374579 A1* | 12/2017 | Wang .................... H04W 28/08 |
| 2017/0374644 A1* | 12/2017 | Ryu ...................... H04W 76/11 |
| 2018/0254919 A1* | 9/2018 | Van De Velde ...... H04L 12/462 |
| 2019/0172096 A1* | 6/2019 | Tenant de la Tour ...................... G06Q 30/0267 |

OTHER PUBLICATIONS

Foreign Communication Related to a Related Counterpart Application, PCT Application No. PCT/KR2016/012649, Written Opinion dated Feb. 8, 2017, 8 pages.

Carlos J. Bernardos et al., "Wi-Fi Internet connectivity and privacy: hiding your tracks on the wireless Internet", 2015 IEEE Conference on Standards for Communications and Networking (CSCN), Oct. 28, 2015, pp. 193-198.

Pekko Orava et al., "Temporary MAC Addresses for Anonymity", IEEE P802.11 Wireless LANs, May 1, 2002, 17 pages.

Supplementary European Search Report dated Oct. 22, 2018 in connection with European Patent Application No. 16 86 2475, 9 pages.

* cited by examiner

Scenario A

Scenario B

METHOD, UE AND NETWORK NODE FOR PROTECTING USER PRIVACY IN NETWORKS

CROSS-REFERENCE TO RELATED APPLICATION(S) AND CLAIM OF PRIORITY

The present application is related to and claims priority under 35 U.S.C. § 119(a) to an Indian Provisional Patent Application filed on Nov. 5, 2015 in the Indian Intellectual Property Office and assigned Serial No. 5991/CHE/2015, and an Indian Patent Application filed on Sep. 28, 2016 in the Indian Intellectual Property Office and assigned Serial No. 5991/CHE/2015, the entire contents of each of which are incorporated herein by reference.

TECHNICAL FIELD

The embodiments herein generally relate to privacy management systems. More particularly related to a method, User equipment (UE), and network node for protecting user privacy in a network.

BACKGROUND

In existing mechanisms for heterogeneous networks (e.g., interworking Long-Term Evolution (LTE) networks to Wireless Local Area Network (WLAN)), when a mobile device (UE) sends an International Mobile Subscriber Identity (IMSI) and a permanent WLAN media access control (MAC) address of the device to a network during activation of LTE-WLAN aggregation or during attach or association procedure either in the LTE network or in the WLAN network, tracking the mobile device based on permanent (WLAN) MAC address of the mobile device, that can be linked to the IMSI, is possible.

A hacker may be able to track the mobile device by mapping the IMSI with the permanent WLAN MAC address when the UE transfers the IMSI and the permanent WLAN MAC address in a message or in different messages. Since the expose of the permanent WLAN MAC address is not under the control of LTE and frequency of revealing the permanent WLAN MAC address over air can be more compare to IMSI in the message over the air, the hacker can track the mobile device with the permanent WLAN MAC address. Therefore, the permanent WLAN MAC address based tracking should be prevented as to obtain user privacy in LTE networks.

The above information is presented as background information only to help the reader to understand the present disclosure. Applicants have made no determination and make no assertion as to whether any of the above might be applicable as Prior Art with regard to the present application.

SUMMARY

To address the above-discussed deficiencies, it is a primary object to provide a method, User equipment (UE), and network node for managing privacy of a user in a network.

Another object of the embodiments herein is to provide a method for generating a Locally Administered Randomized WLAN MAC Address (LRA), wherein at least one portion of the LRA is randomly generated based on at least one of a network pseudonym identity and a network parameter.

Another object of the embodiments herein is to provide a method for transmitting the LRA to a network node.

Accordingly, the embodiments herein provide a method for managing privacy of a user in a network. The method includes generating, by a User equipment (UE), a Locally Administered Randomized WLAN MAC Address (LRA), wherein at least one portion of the LRA is randomly generated based on at least one of a network pseudonym identity and a network parameter. Further, the method includes transmitting, by the UE, the LRA to a network node.

In an embodiment, the network pseudonym identity comprises one of a parameter of a Globally Unique Temporary Identity (GUTI), a Cell Radio Network Temporary Identity (C-RNTI), Extensible Authentication Protocol (EAP) Pseudonym Username, and a nonce.

In an embodiment, the network parameter comprises one of a Cell Identity (Cell ID), a Mobile network code, an Evolved-Universal Terrestrial Radio Access Network (E-UTRAN) Cell Global Identifier (ECGI), a network node ID, and a Data Radio Bearer Identifier.

In an embodiment, the network pseudonym identity is used for authorized tracking and identification of the user by the heterogeneous network.

In an embodiment, the LRA is randomly generated and does not include one of a permanent identifier and a universally administered WLAN MAC address originally assigned to a wireless interface in the UE.

Accordingly the embodiments herein provide a method for managing privacy of a user in a network. The method includes generating, by a network node, a Locally Administered Randomized WLAN MAC Address (LRA), wherein at least one portion of the LRA is randomly generated based on at least one of a network pseudonym identity and a network parameter. Further, the method includes transmitting, by the network node, the LRA to a User Equipment (UE).

Accordingly the embodiments herein provide a UE for managing privacy of a user in a network. The UE includes a memory, a processor, coupled to the memory, and an LRA generator, coupled to the processor, and a transceiver, coupled to the processor. The LRA generator is configured to generate a Locally Administered Randomized WLAN MAC Address (LRA), wherein at least one portion of the LRA is randomly generated based on at least one of a network pseudonym identity and a network parameter. The transceiver is configured to transmit the LRA to a network node.

Accordingly the embodiments herein provide the network node for managing privacy of a user in a network. The network node includes a memory, a processor, coupled to the memory, and an LRA generator, coupled to the processor, and a transceiver, coupled to the processor. The LRA generator is configured to generate a Locally Administered Randomized WLAN MAC Address (LRA), wherein at least one portion of the LRA is randomly generated based on at least one of a network pseudonym identity and a network parameter. The transceiver is configured to transmit the LRA to a network node.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
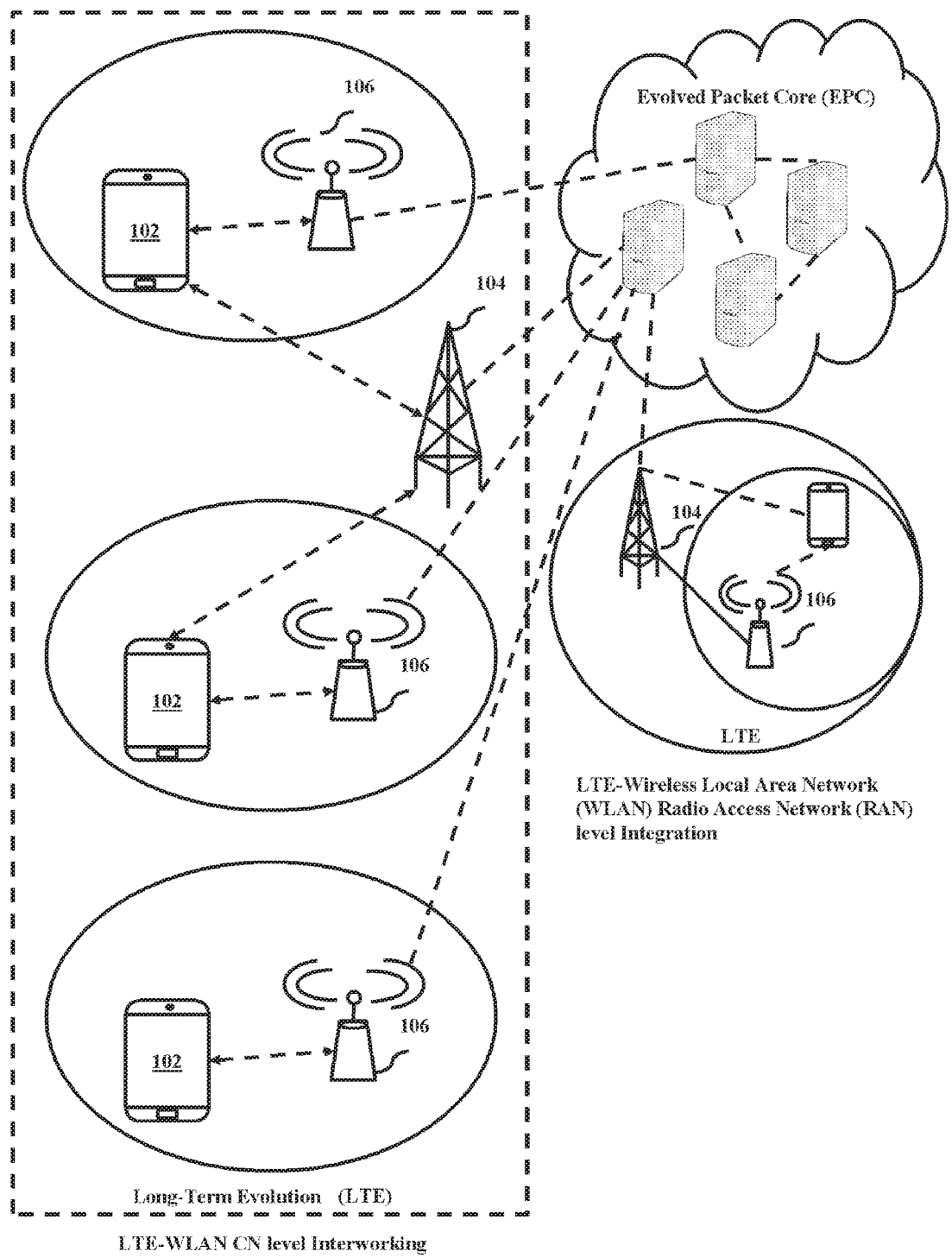
FIG. 1 is an example scenario illustrating LTE-WLAN Interworking.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication devices.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein disclose a method for managing privacy of a user in a network. The method includes generating a Locally Administered Randomized WLAN MAC Address (LRA), wherein at least one portion of the LRA is randomly generated based on at least one of a network pseudonym identity (or a network temporary identity) and a network parameter. Further, the method includes transmitting the LRA to a network node, to identify the UE further in the network and for routing.

Unlike the conventional systems and methods, the proposed method (at the UE or at the network node) provides a Locally Administered Randomized WLAN MAC Address (LRA) instead of an universally administered WLAN MAC address originally assigned to a wireless interface in the UE, wherein at least one portion of the LRA is randomly generated based on at least one of a network pseudonym identity and a network parameter. Further, the network pseudonym identity is used for authorized tracking and identification of the user/device by the heterogeneous network. The mapping of the pseudonym identity and the permanent identities (e.g., the mapping of the IMSI and the GUTI) is known only to the UE and the network node, so that the user's identity privacy is protected.

Unlike the conventional systems and methods, the UE generates a fresh LRA, whenever a new network pseudonym identity is assigned to the UE by the network node. If the network node indicates to refresh the LRA, then the UE initiates appropriate procedure (for example, IEEE 802.11 re-association procedure) with an access point (AP) to take the freshly generated LRA into use. Further, using the network pseudonym identity, which is 16 bits, is good enough to provide enough entropy for the LRA and to maintain privacy, when considering the number of UEs that can be severed by an AP or even by a network mobility set. Unlike the conventional methods and systems, the proposed method (at the UE or at the network node) encrypts the universally administered WLAN MAC address before send it over the air whenever it is possible, to avoid mapping with the IMSI. The encrypted universally administered WLAN MAC address is exchanged between the UE and the network node. Thus managing privacy of the user in the network.

Unlike the conventional systems and methods, the proposed method (at the UE or at the network node) avoids collision of LRAs' in a scenario where the access point, serving multiple UEs, is shared by more than one operator (for example, in a Stadium), to maintain uniqueness in the network.

Figure 20:
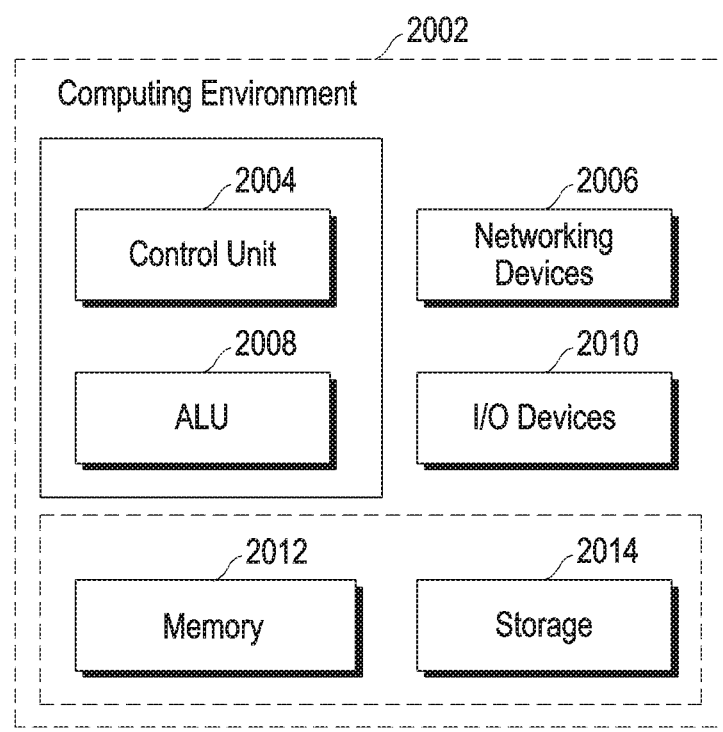
FIG. 20 illustrates a computing environment implementing the method and system for managing privacy of the user in a network, according to an embodiment as disclosed herein

Referring now to the drawings, and more particularly to FIGS. 1, through 20, where similar reference characters denote corresponding features consistently throughout the figures, there are shown preferred embodiments.

FIG. 1 is an example scenario illustrating Long term evolution (LTE) and Wireless local area network (WLAN) interworking, according to an embodiment as disclosed herein. The Third Generation Partnership Project (3GPP), has commenced to improve the LTE-WLAN interworking architecture to allow 3GPP network service providers to offload data traffic from wide area wireless spectrum to WLANs in high user density areas. Evolved Packet Core (EPC) and LTE RAN provides IP access to the UE via the non-3GPP networks (WLAN) for transfer of IP traffic between the packet data network (PDN) and the UE.

In the CN level interworking scenario, the IP access procedures to the WLAN via the EPC differ based on whether the WLAN access network is Trusted or Untrusted. Whether a WLAN access network is Trusted or Untrusted is not a characteristic of the access network, it is the MNO's decision, who administrates the EPC. The MNO's decision can be based on the WLAN access network deployment scenarios and security features supported by the WLAN access network. To access the EPC either from Trusted or untrusted WLAN access network, the UE performs an Extensible Authentication Protocol (EAP) mechanism using the Authentication and Key Agreement (AKA) as the EAP method for authentication and session key distribution. Unique identification of a wireless device is very essential to provide network access and privileged/priority services after successful authenticity verification. LTE subscribers are identified with the International Mobile Subscriber Identity (IMSI) and it is used to identify the Subscription profile and credentials in the core network. The UE authenticates the EPC and the EPC verifies the authenticity of the IMSI.

When considering the LTE-WLAN RAN level integration, it introduces user plane data aggregation where a user plane data radio bearer can be served by the LTE and/or by the WLAN. LTE-WLAN carrier aggregation solutions provides better control and utilization of resources on both radio links and increase the aggregate throughput, system capacity and is transparent to the core network. External interface (XW) between the LTE eNB and WLAN is used for communication between the LTE and the WLAN RATs. The logical node WLAN Termination (WT), is the termination point of Xw at WLAN. WT can be implemented at a WLAN Access Point (AP), WLAN Access Controller, or any another physical entity in the WLAN. In addition to the LTE protection, the WLAN communication established between the WLAN Access Point (AP) and the UE shall be protected using the native IEEE 802.11i security mechanisms. The security key for protecting the WLAN link is computed from the current LTE Access Stratum (AS) security context established between the UE and the eNB.

In a scenario where network is the LTE network, the IMSI globally and uniquely identifies a subscriber on any 3GPP PLMN. If a UE uses the IMSI in plaintext often, then it allows tracking of the UE by a passive attacker. To enhance privacy, 3GPP provides a mechanism wherein the temporary identities (for example, GUTI as a pseudonym for the IMSI) are used to identify a specific UE dynamically in the LTE networks.

In a scenario where network is the WLAN network, the permanent MAC address of a wireless network interface (hardware address) is the globally unique permanent identifier of the wireless device (burned-in-address (BIA)). The permanent MAC address which is 6 bytes in length is assigned by the WLAN chipset or device manufacture to the WLAN chipset in the UE to identify the device in the wireless network and it is used for routing within the WLAN. The permanent MAC address can also be locally administered. The locally administered MAC addresses are assigned by the user or the network administrator, superseding the universally administered BIA. The permanent MAC address of the UE is transmitted in clear text with every frame between the UE and the WLAN AP over the air. In conventional systems and methods, WLAN security mechanisms encrypt only the higher layer payloads. Thus MAC header that includes the source and destination MAC addresses are transmitted in clear text always. Hence, the existing systems do not provide any effective countermeasure against tracking of the UE using the permanent MAC address. Similar scenarios when two RATs interwork are illustrated in conjunction with FIG. 2 and FIG. 3.

Figure 2:
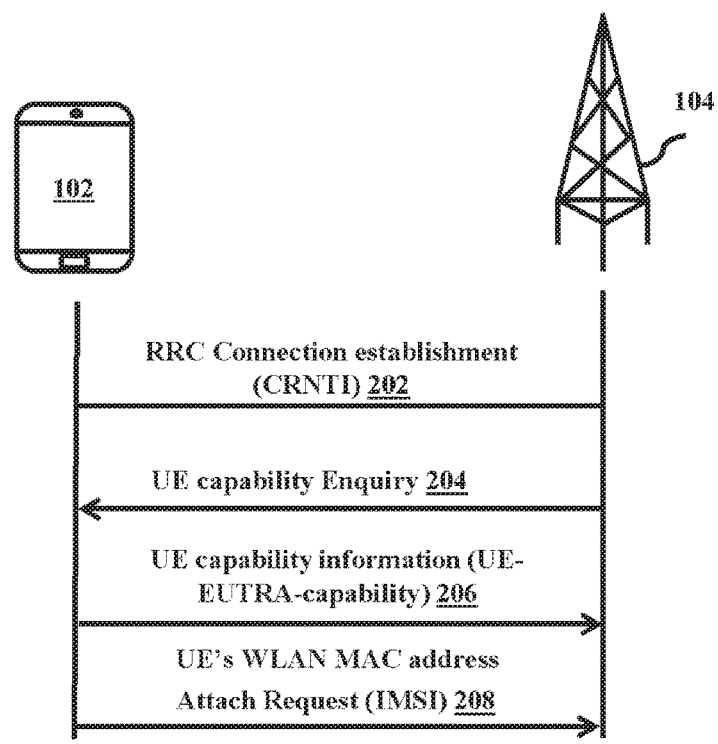
FIG. 2 is a sequence diagram illustrating a step by step process of user privacy vulnerability in LTE when the LTE interworking with WLAN.

FIG. 2 is a sequence diagram illustrating a step by step process of user privacy vulnerability in LTE when the LTE interworking with WLAN, according to an embodiment as disclosed herein. Radio Resource Control (RRC) connection (202) is established between the UE 102 and the eNB 104. During the RRC connection Cell Radio Network Temporary Identity (C-RNTI) is exchanged between the UE 102 and the eNB 104. After RRC connection, the eNB 104 performs a UE capability enquiry (204) with the UE. After receiving the UE capability enquiry, the UE 102 sends (206) UE capability information to the eNB 104. Further, the UE 102 sends (208) the universally administered WLAN MAC address of the UE 102 to the eNB 104 as an attach request. The WLAN MAC address can be sent unprotected (prior to security activation). Therefore an eavesdropper (i.e., a fake network node) can associate the C-RNTI and the corresponding messages to map the international mobile subscriber identity (IMSI) and the WLAN MAC address of the UE 102. Thus privacy of the user of the UE 102 is compromised, as the WLAN MAC address of the UE is always transmitted in clear text in all further communications.

Figure 3:
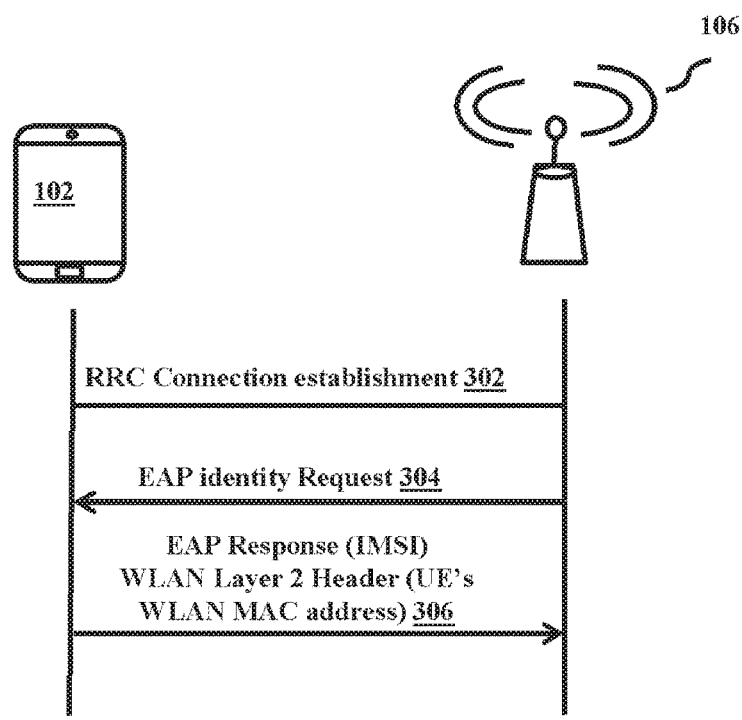
FIG. 3 is a sequence diagram illustrating a step by step process for User Privacy vulnerability when performing EPC access via WLAN.

FIG. 3 is a sequence diagram illustrating a step by step process for User Privacy vulnerability when performing EPC access via the WLAN, according to an embodiment as disclosed herein. The 802.11 association is established (302) between the UE 102 and the wireless local area network access point (WLAN AP) 106. Further, the WLAN AP 106 sends (304) a request to the UE 102 for sharing Extensible Authentication Protocol (EAP) identity. In response to the EAP identity request, the UE 102 sends (306) an EAP response message to the WLAN AP 106 for identification during the trusted access authentication run or when performing untrusted access authentication. The EAP response message includes the IMSI and the WLAN MAC address. It is possible for the eavesdropper to know the IMSI and corresponding WLAN MAC address, as both are provide by the UE 102 to the WLAN AP 106 in a clear text, to compromise user privacy. Thus there is a need for a system and method to mitigate user traceability threat in the network.

Figure 4:
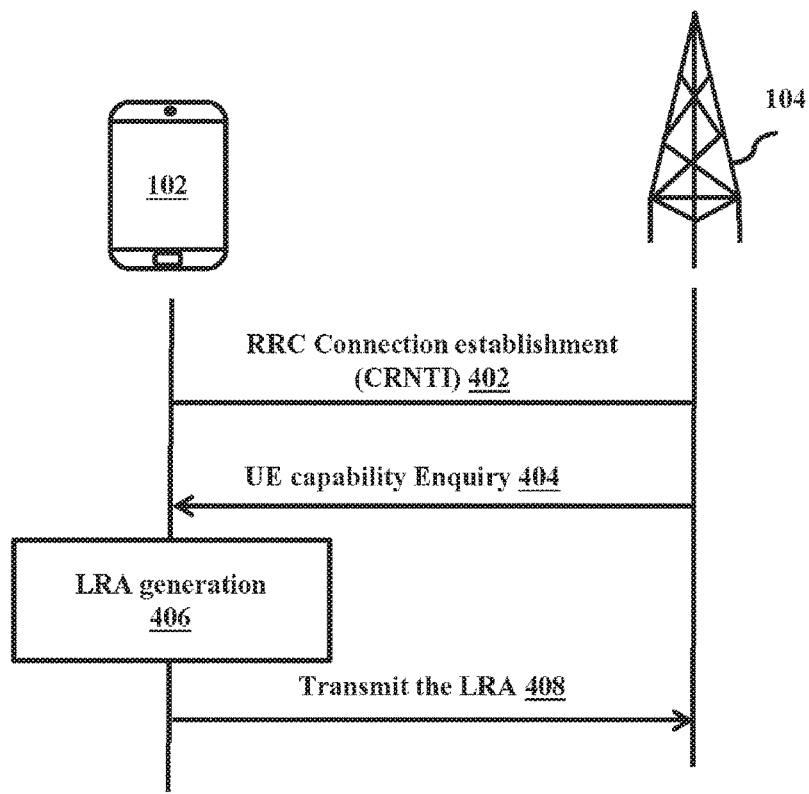
FIG. 4 is a sequence diagram illustrating a step by step process for managing privacy of a user when a User Equipment is communicating with an evolved node B (eNB); according to an embodiment as disclosed herein.

FIG. 4 is a sequence diagram illustrating a step by step process for managing privacy of the user when the UE 102 is communicating with the eNB 104; according to an embodiment as disclosed herein. The RRC connection is established (402) between the UE 102 and the eNB 104. Further, the eNB 104 performs (404) a UE capability enquiry with the UE 102. In response to the UE capability enquiry, the UE 102 generates (406) a Locally Administered Randomized WLAN MAC Address (LRA), wherein at least one portion of the LRA is randomly generated based on at least one of a network pseudonym identity and a network parameter.

In an embodiment, the network pseudonym identity comprises one of a parameter of a Globally Unique Temporary Identity (GUTI), a Cell Radio Network Temporary Identity (C-RNTI), Extensible Authentication Protocol (EAP) Pseudonym Username, and a nonce (i.e., the nonce is a random number that varies dynamically). The GUTI is explained in conjunction with FIG. 7.

In an embodiment, the network parameter comprises one of a Cell Identity (Cell ID), a Mobile network code, an E-UTRAN Cell Global Identifier (ECGI), a network node ID, and a Data Radio Bearer Identifier.

Further, the UE 102 transmit (408) the LRA to the eNB 104. The LRA is explained in conjunction with FIG. 6 where second-least-significant bit of the most significant byte of the WLAN MAC address is set to be 1.

Figure 5:
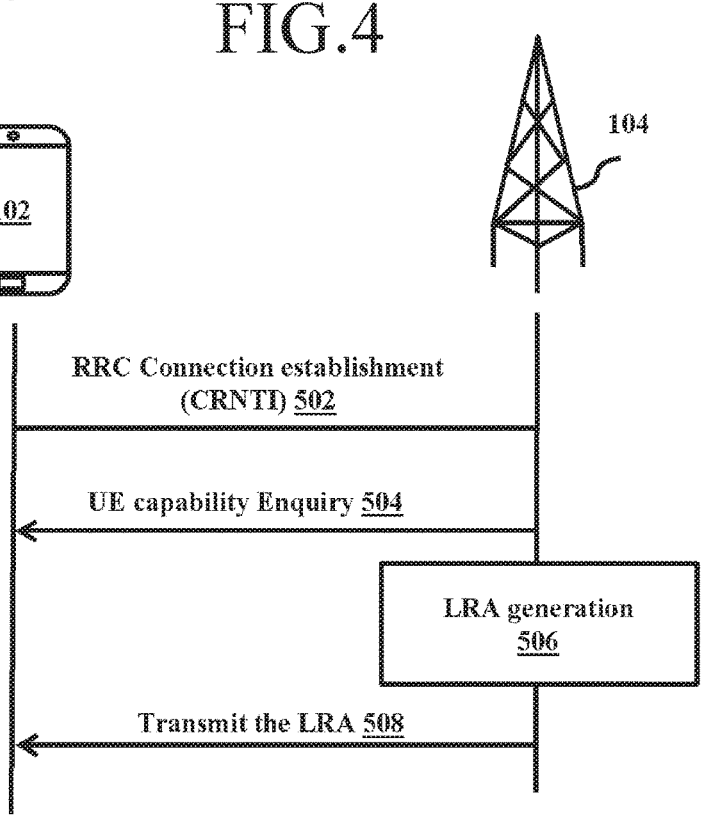
FIG. 5 is a sequence diagram illustrating a step by step process for managing privacy of a user when a User Equipment is communicating with a wireless local area network access point (WLAN AP); according to an embodiment as disclosed herein.

FIG. 5 is a sequence diagram illustrating a step by step process for managing privacy of a user when the UE 102 is communicating with the WLAN AP 106; according to an embodiment as disclosed herein. The RRC connection is established (502) between the eNB 104 and the UE 102. Further, the eNB 104 performs (504) a UE capability enquiry with the UE 102. Further, the eNB 104 generates (506) the LRA. Furthermore, the eNB 104 transmits (508) the LRA to the UE 102. The LRA is explained in conjunction with FIG. 6 where second-least-significant bit of the most significant byte of the WLAN MAC address is set to be 1. In an embodiment, the LRA start with at least one of the following: x2, x6, xA and xE ('x' being any value)

Figure 6:
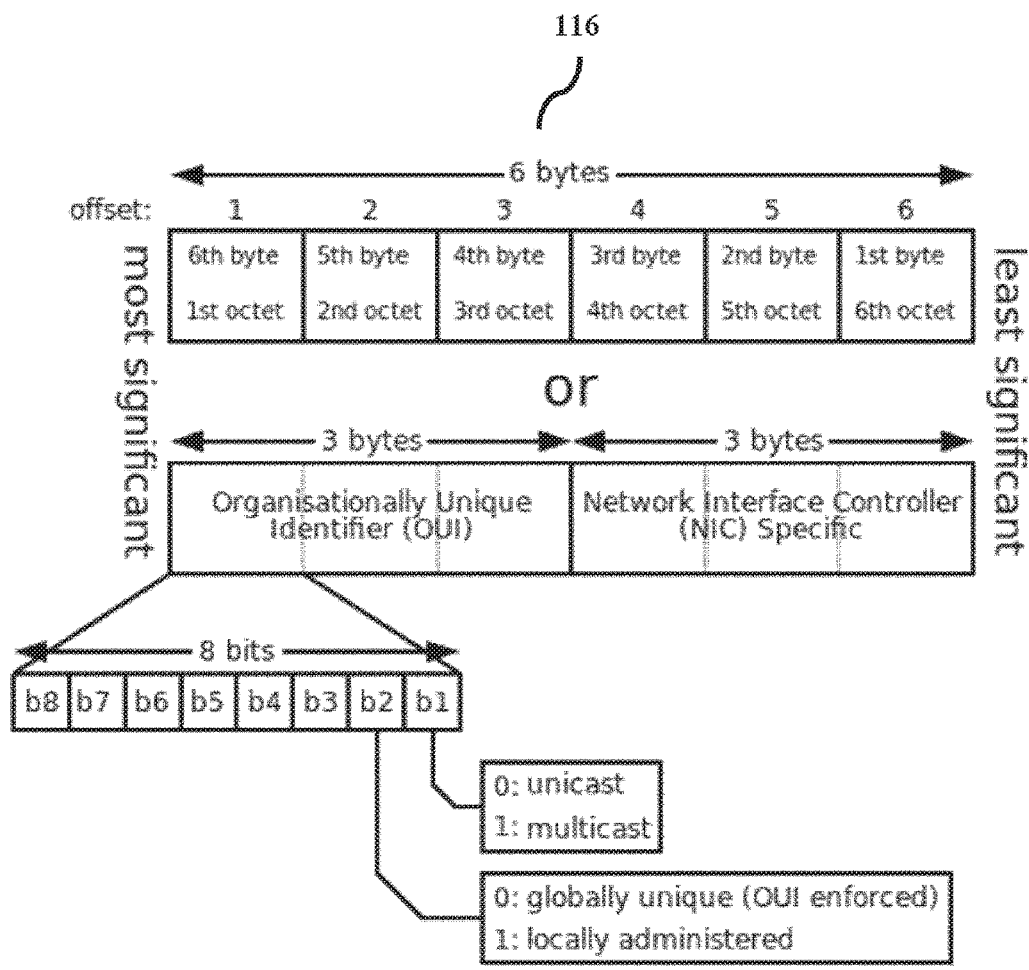
FIG. 6 is an example illustrating of a universally administered WLAN MAC address originally assigned to a wireless interface in the UE, according to an embodiment as disclosed herein.

FIG. 6 is an example illustrating of a universally administered WLAN MAC address (WLAN MAC address) originally assigned to a wireless interface in the UE 102, according to an embodiment as disclosed herein. The WLAN MAC address is 48 bits in size. The WLAN MAC address can be universally or locally administered. A universally administered WLAN MAC address (burned-in-address (BIA)) is uniquely assigned by device manufacturer to the UE. The universally administered WLAN MAC address is composed of two components:

Organizationally Unique Identifier (OUI), which are the first three octets (in transmission order) and identify the organization that issued the identifier; and Network Interface Controller (NIC) Specific, which are the following three octets, assigned by the manufacture of the NIC.

Further, the locally administered addresses are assigned by the user or device itself or the network administrator or a network entity, superseding the universally administered burned-in WLAN MAC address. The universally and locally administered WLAN MAC addresses are distinguished by setting the second-least-significant bit of the most significant byte of the address (i.e., U/L bit) as shown in the FIG. 6.

Figure 7:
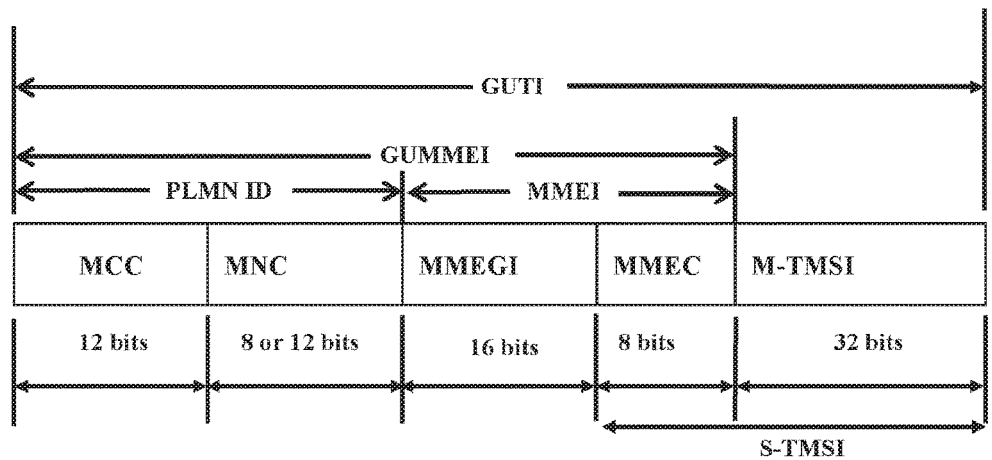
FIG. 7 is an example illustrating of a Globally Unique Temporary Identity (GUTI), according to an embodiment as disclosed herein.

FIG. 7 is an example illustrating of the GUTI, according to an embodiment as disclosed herein. The GUTI is assigned by the core network and the GUTI is valid as long as the UE 102 is registered with the Evolved Packet Core (EPC). The GUTI identifies the UE 102 as well as a Mobility Management Entity (MME), serving the UE 102, uniquely. The GUTI includes at least one of a MME temporary mobile subscriber identity (M-TMSI), a MME code (MMEC), a MME Group ID (MMEGI), a Mobile Network Code (MNC), a Mobile Country Code (MCC). The M-TMSI uniquely identifies the UE 102 within the MME. Further, S-TMSI (i.e., combination of MMEC and M-TMSI) locally identifies the UE 102 within the MME group (unique identity of the UE 102 within a MME Pool). The MCC, the MNC, and the MMEGI are used to uniquely identity the MME within a public land mobile network (PLMN). There are different alternatives (FIGS. 8a-8f) possible to compile the LRA using least one of the network pseudonym identity and the network parameter. To indicate that LRA is locally administrated, the second-least-significant bit of the most significant byte of the address is set for the alternatives explained in conjunction with FIGS. 8a-8f.

FIGS. 8a-8f is an example illustrating the LRA, according to an embodiment as disclosed herein. The LRA is generated using the whole or part of the network pseudonym identities (e.g., GUTI, C-RNTI, or the like) along with other network parameters (e.g., Cell ID, Mobile network code, or the like), to ensures uniqueness and privacy. By using network pseudonym identities for the LRA generation, aids in authorized tracking and identification of the subscriber by the network to support mobility, lawful interception of subscriber traffic and to satisfy law enforcement needs and at the same time protect user privacy from unauthorized third parties.

Figure 8A:
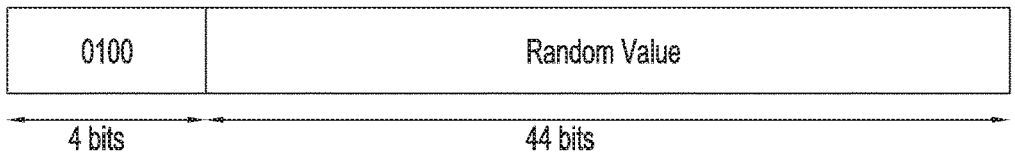
FIGS. 8A-8F are examples illustrating a Locally Administered Randomized WLAN MAC Address (LRA), according to an embodiment as disclosed herein.

FIG. 8a is an example of the LRA where the LRA is generated randomly by the UE 102. The randomly generated LRA is sent to the eNB 104. In the context of LWI, randomly generated LRA by the UE 102 may not be the best alternative, as the LRA is completely under the control of the UE 102 and a bad UE implementation might not refresh the LRA at proper intervals and also poor implementation results in high possibility of collision with other UE's WLAN MAC address. From user privacy perspective, network based solution is always preferred to gain the subscriber confidence, as there is direct impact on the network operator reputation. Further the LRA generated by the UE is neither an authenticated anonymous identity nor network assigned pseudonym after authenticity verification, therefore UE centric LRA cannot be considered as the authentic parameter for authorized tracking and for lawful interception. Considering the above complexities, WLAN MAC Address generation using LTE RAN Parameters is chosen as another alternative. The WLAN MAC address generation using LTE RAN Parameters is explained in conjunction with FIG. 8*b*.

Figure 8B:
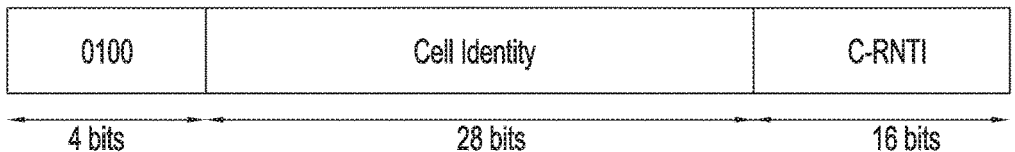
Figure 8C:
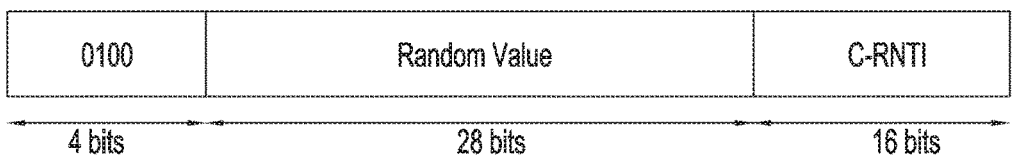
Figure 11:
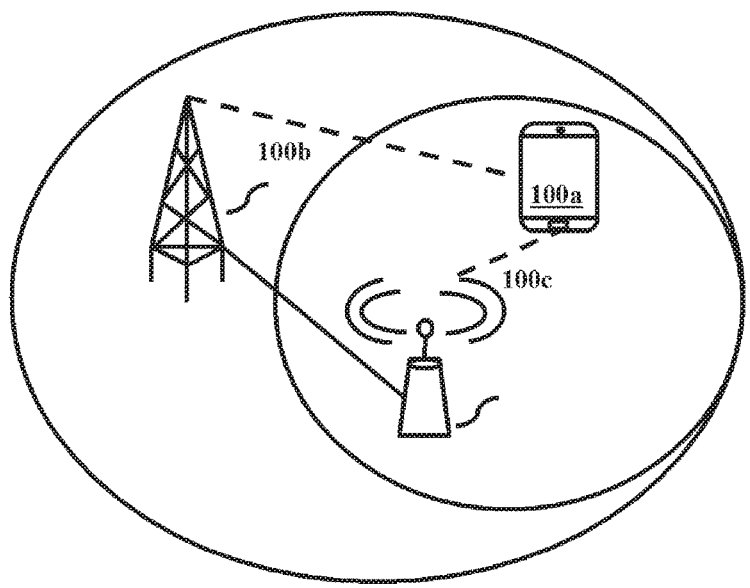
FIG. 11 is an example scenario illustrating LRA collision avoidance mechanism for LWA, according to an embodiment as disclosed herein.
Figure 11:
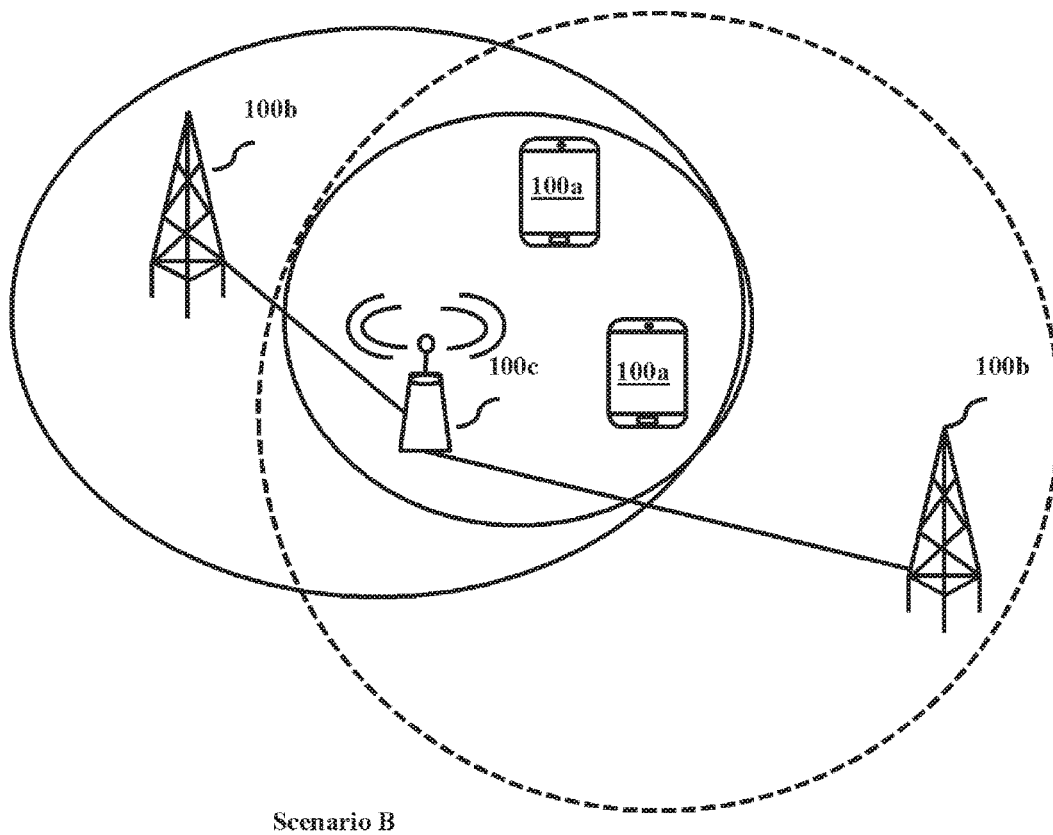

FIG. 8*b* is an example of the LRA where the LRA is generated using C-RNTI & RAN Parameters by the UE 102. When cell specific LTE RAN temporary identity is used for LRA generation, the generated LRA will not conflict with any other UE's LRA on the WLAN within the cell, provided if the WLAN is not shared with more than one cell as shown in FIG. 11, scenario A. If the WLAN is shared with more than one cell (or eNBs), as shown in FIG. 11, scenario B, then there is possibility of collision, as the same C-RNTI can be assigned by different eNBs to different UEs, which is under the coverage of the WLAN AP 106. In order to reduce the collision, in addition to the C-RNTI, either the Cell ID (as shown in FIG. 8*b*) or the random value (as shown in FIG. 8*c*) or reserved bits (for example all "0" or "1" or like so) is used to generate the 48 bits WLAN MAC address. The use of cell-ID of the LTE provides identifiable location information of the UE and collection of Cell-IDs of the UE 102 might provide enough information for passive tracking, thus it may not the best mode.

The complexity depends on how the LWA bearers are handled during the LTE mobility. If the LWA bearers are released at every handover and added after the handover, then the LRA as shown in FIG. 8*c* is the straightforward and simple solution, as whenever a new C-RNTI is assigned (after the Inter/Intra cell Handover), the UE 102 shall generate and configures a new LRA using the newly assigned C-RNTI for the WLAN interface to use. The eNB can obtain the newly generated LRA from the UE 102 after the handover. However, if the LWA bearer(s) is to be maintained even when the Inter/Intra Cell handover happens, then C-RNTI based solution is very complex and may not be a feasible solution.

Figure 8D:
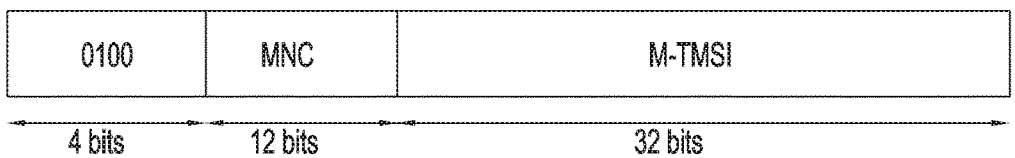
Figure 8E:
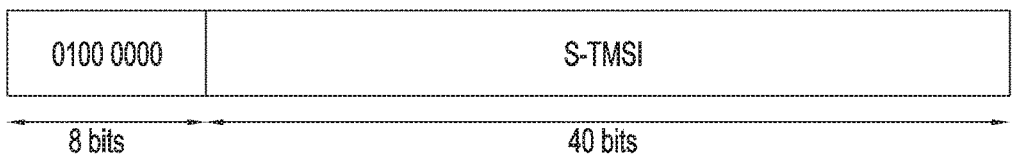

FIG. 8*d* is an example of the LRA where the LRA is generated using LTE Core Network Parameters (i.e., M-TMSI & Core Network Parameters). By using M-TMSI and core network parameters have the advantage of providing uniqueness over the alternative where LRA is generated using S-TMSI (as shown in FIG. 8*e*), especially when more than one MNO share the WLAN access network for interworking, as shown in FIG. 11, scenario B. Since the LRA as shown in FIG. 8*d* use the Mobile Network Code (MNC), it provides uniqueness to the LRA even when two UEs have the same M-TMSI value assigned by different mobile networks. There is very low possibility of address conflict or no address conflict, explained in conjunction with FIG. 11.

Further, there is no overhead introduced during mobility between WLAN APs, between LTE cells/eNBs and also during RRC Idle to connected state, as change of LRA is required only when a new GUTI is assigned. The LRA as shown in FIG. 8*d* is applicable even when the LWA bearers are maintained in the WLAN during Inter/Intra Cell handovers.

Figure 8F:
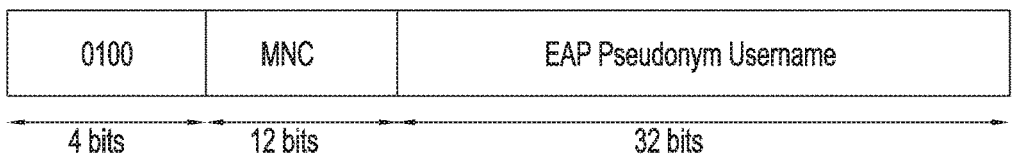

Furthermore, consider a scenario, where there is no LTE connectivity (e.g., flight mode), but access to EPC via WLAN is to be performed, then the UE construct the LRA using the username part of the EAP Pseudonym identity obtained from the network as shown in FIG. 8*f*. If Pseudonym identity is not available, then the UE generates LRA as explained in FIG. 8*a*, then after obtaining the Pseudonym identity, performed fast re-authentication to register a fresh LRA generated using the Pseudonym identity. The WLAN AP 106 verifies the authenticity of the fresh LRA generated using the Pseudonym identity with the network. The fresh LRA generation during a LWA refresh mechanism is explained in conjunction with the FIG. 9.

Figure 9:
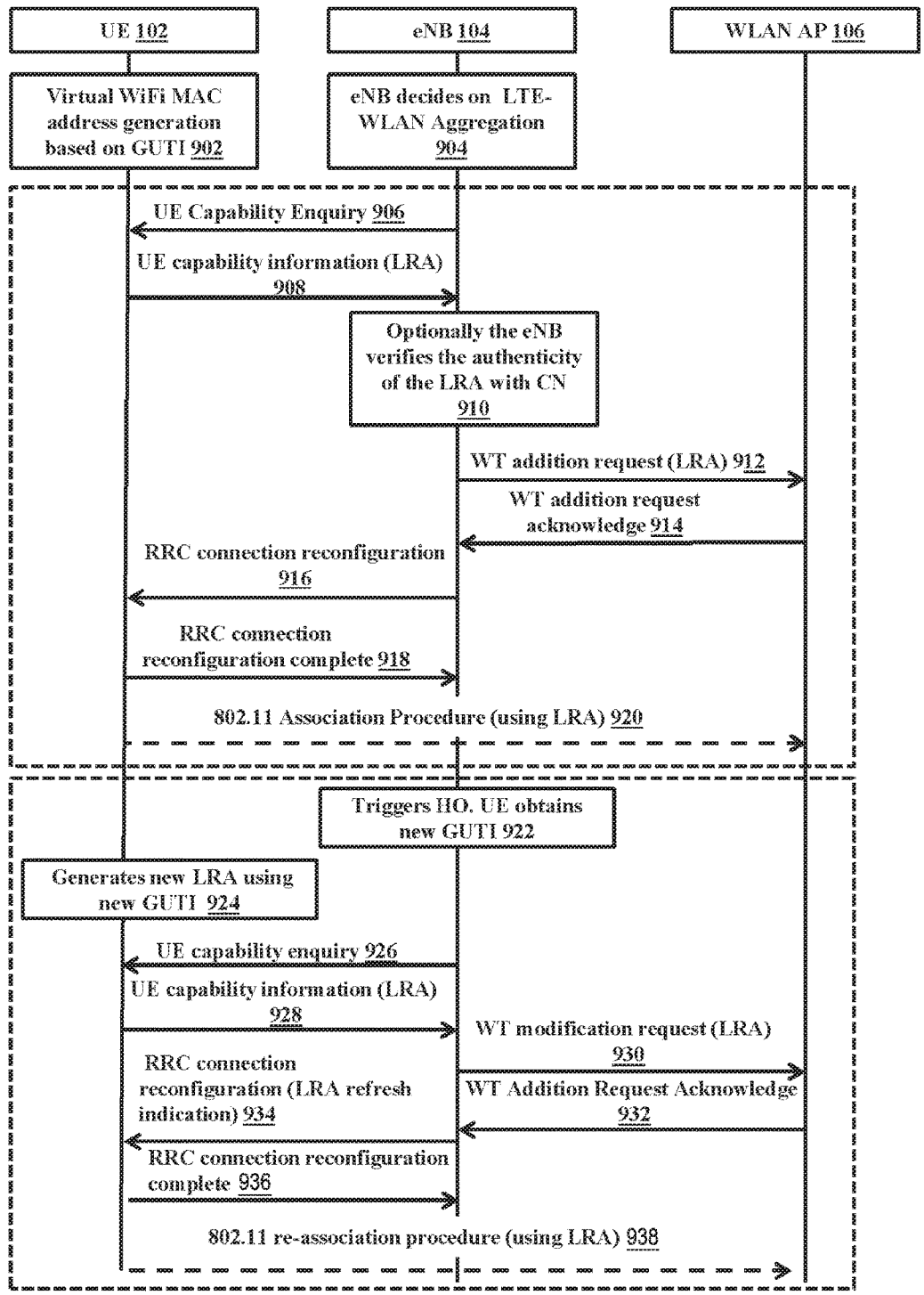
FIG. 9 is a sequence diagram illustrating a step by step process of LWA refresh mechanism, according to an embodiment as disclosed herein.

FIG. 9 is a sequence diagram illustrating a step by step process of the LWA refresh mechanism, according to an embodiment as disclosed herein. The UE 102 generates (902) the LRA based on GUTI. The eNB 104 decides (904) on LTE-WLAN aggregation. Further, the UE 102 receives (906) UE capability enquiry message form the eNB 104. In response, the UE 102 sends (908) the UE capability Information, including the LRA, to the eNB 104. The eNB 104 optionally verifies (910) the authenticity of the LRA with core network. The eNB 104 sends (912) a WLAN Termination (WT) addition request message, including the LRA, to the WLAN AP 106. The eNB 104 receives (914) the WT addition Request Acknowledgement message from the WLAN AP 106. The eNB 104 sends (916) RRC connection reconfiguration, to the UE 102 to initiate the WLAN association procedure. The eNB 104 receives (918) the RRC connection reconfiguration complete message from the UE 102.

The UE 102 initiates (920) 802.11 Association Procedure with the WLAN AP 106 using the LRA. Considering the case of LTE inter/intra handover (maintain the session with the AP during and after the LTE handover), when the eNB 104 triggers (922) a handover and the UE 102 can obtains a new GUTI. If a new GUTI is obtained by the UE, then the UE 102 generates (924) a new LRA using the new GUTI. The eNB 104 sends (926) the UE capability enquiry message to the UE 102. The eNB 104 receives (928) the UE capability information, including the new LRA, from the UE 102. The eNB 104 sends (930) the WT Modification Request message, including the new LRA, to the WLAN AP 106. The eNB 104 receives (932) a WT Addition Request Acknowledge message from the WLAN AP 106. The eNB 104 sends (934) RRC connection reconfiguration message, including an indication to refresh the new LRA, to the UE 102. The eNB 104 receives (936) the RRC connection reconfiguration complete message. The UE 102 initiates (938) 802.11 Re-Association Procedure, using the new LRA, with the WLAN AP 106, to activate the new LRA generated using the new GUTI.

Figure 10:
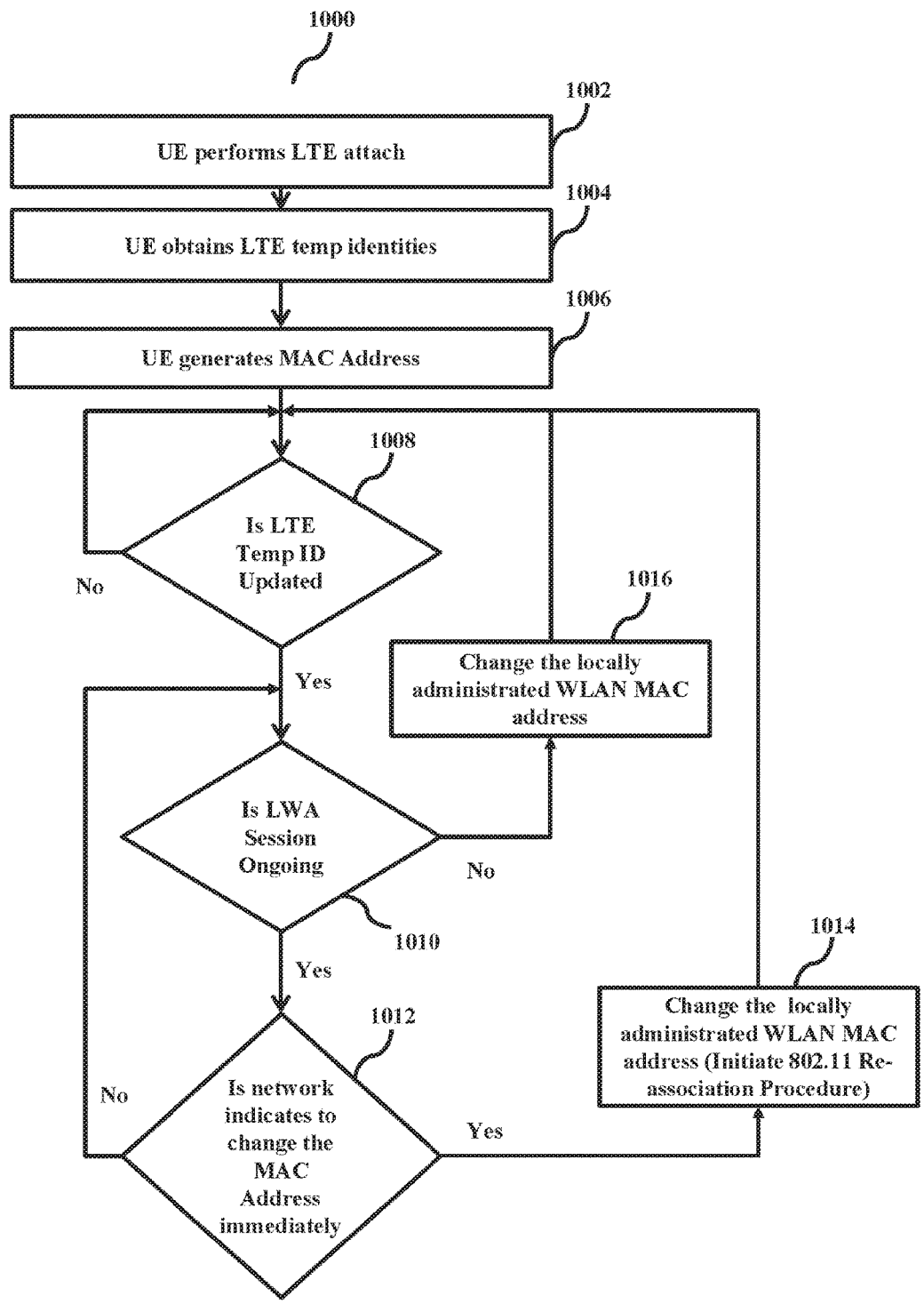
FIG. 10 is a flowchart illustrating a method for initiating location update procedure to obtain a new GUTI during LWA refresh mechanism, according to an embodiment as disclosed herein.

FIG. 10 is a flowchart illustrating a method 1000 for initiating location update procedure to obtain the new GUTI during LWA refresh mechanism, according to an embodiment as disclosed herein. At step 1002, the method includes performing LTE attachment procedure with the eNB 104. The method allows the UE 102 to perform LTE attachment procedure with the eNB 104. At step 1004, the method includes obtaining LTE temporary identities from the eNB 104 or from the network (MME). The method allows the UE 102 to obtain LTE temporary identity from the eNB 104 or from the network (MME). At step 1006, the method includes generating WLAN MAC address using the LTE temporary identities. The method allows the UE to generate the MAC address using the LTE temporary identities. At step 1008, the method includes determining whether the LTE temporary identity is to be updated or not. The method allows the UE 102 to determine whether the LTE temporary identity is to be updated or not.

At step 1008, if it is determined that the LTE temporary identity is to be updated then, at step 1010, the method includes determining whether the LWA session is going on. The method allows the UE 102 to determine whether the LWA session is going on. At step 1010, if it is determined that the LWA session is going on then, at step 1012, the method includes determining whether the network indicates to change the WLAN MAC address immediately. The method allows the UE 102 to determine whether the network indicates to change the WLAN MAC address immediately.

At step 1012, if it is determined that the network indicates to change the WLAN MAC address immediately then, at step 1014, the method includes changing the locally administrated WLAN address. The method allows the UE 102 to change the locally administered WLAN address and initiate 802.11 Re-association Procedure with the eNB 104.

At step 1012, if it is determined that the network does not indicate to change the WLAN MAC address immediately then, at step 1010, the method again determining whether the LWA session is going on. At step 1010, if it is determined that the LWA session is not going on then, at step 1016, the method includes changing the locally administrated WLAN MAC address. The method allows the UE 102 to change the locally administrated WLAN MAC address. Further, at step 1008, if it is determined that the LTE temporary identity is not updated then the step 1008 can be repeated until the LTE temporary identity updated.

FIG. 11 is an example scenario illustrating LRA collision avoidance mechanism for LWA, according to an embodiment as disclosed herein. Usually permanent MAC address guarantees global uniqueness. If the WLAN MAC address is randomized (i.e., dynamically generated and used), would violate the global uniqueness. If more than one UEs use the same WLAN MAC address on the same WLAN AN, then the communications frequently give rise to conflicts/interference. However, the randomized of the WLAN MAC address does not cause any conflict as long as WLAN MAC addresses on a certain WLAN access network (AN) contain no duplication. Unlike the conventional systems and methods, the proposed system ensures at least the uniqueness of the WLAN MAC address on each WLAN AN instead of the global uniqueness. The uniqueness would be violated, if UEs individually update their WLAN MAC address independently. Thus the network co-ordination is needed to derive the LRAs. Even when an operator assigned LTE temporary parameters are used for randomized MAC address (WLAN MAC) generation, can lead to MAC address collision, if the WLAN access network is shared with different cells and/or with different operator as shown in FIG. 11 scenario B. To calculate the probability of LRA collision, consider a set of N possible UEs, such as N=3000 (for example, in a Stadium), and taking r possible random values in the WLAN MAC address r=2^16 (C-RNTI), then the probability that all r samples are unique is calculated using the birthday paradox (shown in equation 1)

$$P = \frac{N!}{N^r(N-r)!} \quad (1)$$

and the probability that at least two of the randomly generated LRAs are the same is given by $$Pc=1-P.$$

The size of the WLAN MAC address is 48 bytes. Thus, the maximum number of WLAN MAC addresses is $2.8147498 \times 10^{14}$. The number of possible addresses available, when different LTE parameters is used to make dynamic MAC address is listed in Table-1. Based on the table-1, using RAN temporary identity (C-RNTI) 16 bits is good enough to provide enough entropy for the LRA and to maintain privacy, when considering the number of UEs that can be severed by an AP or even by a WLAN mobility set.

TABLE 1

| Parameters | No. of available bits | No. of possible LRAs |
|---|---|---|
| C-RNTI | 16 | 65536 |
| M-TMSI | 32 | $4.2950 \times e^9$ |
| S-TMSI | 40 | $1.0995 \times e^{12}$ |
| Random Value | 44 | $1.7592 \times e^{13}$ |

There are different alternatives (i.e., Randomization using C-RNTI, and Randomization using M-TMSI) for LRA collision avoidance mechanism for LWA.

Randomization using C-RNTI: In case, if the C-RNTI alone is used for WLAN MAC address generation, then there is high possibility for two UEs to have the same C-RNTI values assigned by different eNBs and if the WLAN AP 106 is shared between the two eNBs of the PLMN. With the 16 bits of random value within 48 bits, the possibility of collision is around 85%, for example, when the number of UEs within a shared WLAN access network is 500. In order to decrease the probability of WLAN MAC address collisions, a random value of 28 bits (apart from the indication bits) in addition to the C-RNTI to be used. Adding 28 bits of random number to the MAC generation, the probability of collision reduces to less than 1% for a group of 500 UEs, for example.

Randomization using M-TMSI: In case, if the M-TMSI is used for LRA generation along with the MNC, then there is low possibility for two UEs to have the same M-TMSI values assigned by different EPCs (PLMNs) with the inclusion of MNC value, even if the WLAN AP 106 is shared between more than one PLMN. The probability of collision is less than 1% for a group of 500 UEs, for example.

Figure 12:
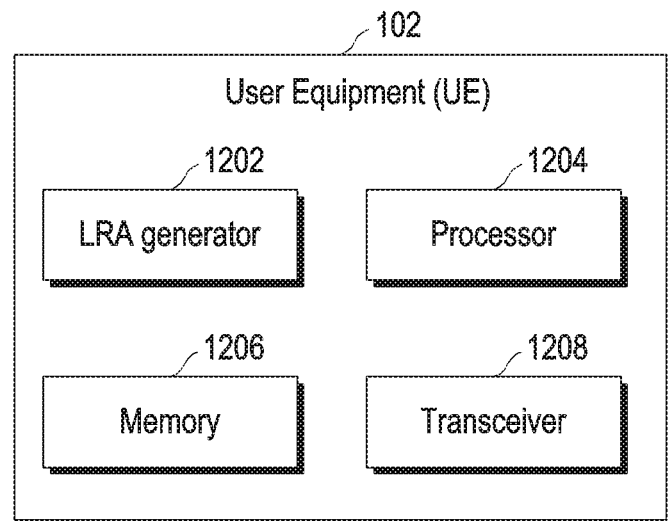
FIG. 12 is illustrates a block diagram of a UE for managing privacy of the user in the network, according to an embodiment as disclosed herein.

FIG. 12 is illustrates a block diagram of the UE 102 for managing privacy of the user in the network, according to an embodiment as disclosed herein. In an embodiment, the UE 102 can be, for example, but not limited to a mobile phone, a smart phone, Personal Digital Assistants (PDAs), a tablet, a phablet, a smart appliance, a television, a consumer electronic device, a monitor, a dual display device, or any other electronic devices.

In an embodiment, the UE 102 includes at least one LRA generator 1202, a processor 1204, a memory 1206, and a transceiver 1208. The LRA generator 1202, coupled to the processor 1204, configured to generate the Locally Administered Randomized WLAN MAC Address (LRA), wherein at least one portion of the LRA is randomly generated based on at least one of the network pseudonym identity and the network parameter. The UE 102 transmits the generated LRA to the eNB 104.

In an embodiment, the network pseudonym identity comprises one of a parameters of a Globally Unique Temporary Identity (GUTI), a Cell Radio Network Temporary Identity (C-RNTI), an Extensible Authentication Protocol (EAP)

Pseudonym Username, and a nonce. In an embodiment, the network parameter comprises one of a Cell Identity (Cell ID), a Mobile network code, an E-UTRAN Cell Global Identifier (ECGI), a network node ID, and a Data Radio Bearer Identifier. The network pseudonym identity is used for authorized tracking and identification of the user by the network. The LRA is randomly generated and does not include one of a permanent identifier and the universally administered WLAN MAC address originally assigned to a wireless interface in the UE 102. The LRA is explained in conjunction with FIGS. 8a-8f.

In an embodiment, the UE 102 and the eNB 104 generates the same LRA for the LWA scenarios, as the required LTE parameters are available with the UE 102 and the eNB 104. In such scenario, the exchange of the MAC address between the UE 102 and the eNB 104 in the LTE signaling (e.g., RRC) messages is avoided. The eNB 104 provides the generated WLAN MAC address of the UE to the WLAN AP 106. The UE 102 uses the LRA as its MAC layer identity and initiate 802.11 association procedure with the WLAN AP 106. Since the WLAN AP 106 obtains the LRA and the required security credentials from the eNB 104, it authenticates the UE 102 and allows WLAN AP 106 access to the UE 102.

The processor 1204 can be, for example, a hardware unit, an apparatus, a Central Processing Unit (CPU), a Graphics Processing Unit (GPU)) communicatively coupled to the memory 1206 (e.g., a volatile memory and/or a non-volatile memory). The memory includes storage locations configured to be addressable through the processor 1204. Further, the memory 1206 can include non-volatile storage elements. Examples of such non-volatile storage elements can include magnetic hard discs, optical discs, floppy discs, flash memories, or forms of electrically programmable memories (EPROM) or electrically erasable and programmable memories (EEPROM). In addition, the memory 1206 can, in some examples, be considered a non-transitory storage medium. The term "non-transitory" can indicate that the storage medium is not embodied in a carrier wave or a propagated signal. However, the term "non-transitory" should not be interpreted that the memory 1206 is non-movable. In some examples, the memory 1206 can be configured to store larger amounts of information than the memory. In certain examples, a non-transitory storage medium can store data that can, over time, change (e.g., in Random Access Memory (RAM) or cache). The transceiver 1208 can be configured for communicating internally between the units and externally with the networks. Further, the transceiver 1208 is configured to transmit the LRA to the UE 102.

The FIG. 12 shows a limited overview of the UE 102 but, it is to be understood that other embodiments are not limited thereto. Further, the UE 102 can include any number of units along with other hardware or software components communicating with each other. For example, the component can be, but not limited to, a process running in the controller or processor, an object, an executable process, a thread of execution, a program, or a computer. By way of illustration, both an application running on a device and the device itself can be a component.

Figure 13:
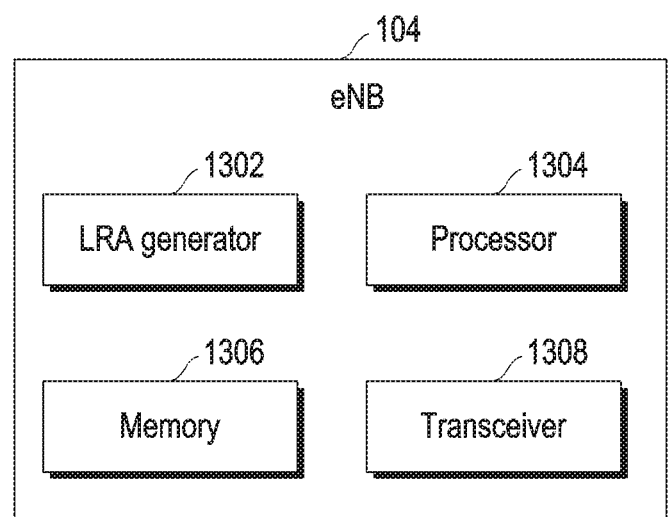
FIG. 13 is illustrates a block diagram of an eNB for managing privacy of the user in the network, according to an embodiment as disclosed herein.

FIG. 13 is illustrates a block diagram of the eNB 104 for managing privacy of the user in the network, according to an embodiment as disclosed herein. In an embodiment, the eNB 104, can be, for example, an Evolved Node B (eNB), or a home eNB, a base station, a base transceiver station, an access point, a wireless access point. In an embodiment, the network can be, for example, a GSM network, a CDMA network, a LTE network, a WLAN network, a communication network, or the like.

In an embodiment, the eNB 104 includes at least one LRA generator 1302, a processor 1304, a memory 1306, and a transceiver 1308. The LRA generator 1302, coupled to the processor 1304, configured to generate the Locally Administered Randomized WLAN MAC Address (LRA), wherein at least one portion of the LRA is randomly generated based on at least one of the network pseudonym identity and the network parameter. The eNB transmits the generated LRA to the UE 102.

In an embodiment, the UE 102 and the eNB 104 generates the same LRA for the LWA scenarios, as the required LTE parameters are available with the UE 102 and the eNB 104. In such scenario, the exchange of the MAC address between the UE 102 and the eNB 104 in the LTE signaling (e.g., RRC) messages is avoided. The eNB 104 provides the generated WLAN MAC address of the UE to the WLAN AP 106. The UE 102 uses the LRA as its MAC layer identity and initiate 802.11 association procedure with the WLAN AP 106. Since the WLAN AP 106 obtains the LRA and the required security credentials from the eNB 104, it authenticates the UE 102 and allows WLAN AP 106 access to the UE 102.

In an embodiment, the network pseudonym identity comprises one of a parameter of a Globally Unique Temporary Identity (GUTI), a Cell Radio Network Temporary Identity (C-RNTI), an Extensible Authentication Protocol (EAP) Pseudonym Username, and a nonce. In an embodiment, the network parameter comprises one of a Cell Identity (Cell ID), a Mobile network code, an E-UTRAN Cell Global Identifier (ECGI), a network node ID, and a Data Radio Bearer Identifier. The network pseudonym identity is used for authorized tracking and identification of the user by the network. The LRA is randomly generated and does not include one of a permanent identifier and the universally administered WLAN MAC address originally assigned to a wireless interface in the UE 102. The LRA is explained in conjunction with FIGS. 8A-8F.

The processor 1304 can be, for example, a hardware unit, an apparatus, a Central Processing Unit (CPU), a Graphics Processing Unit (GPU)) communicatively coupled to the memory 1306 (e.g., a volatile memory and/or a non-volatile memory). The memory includes storage locations configured to be addressable through the processor 1304. Further, the memory 1306 can include non-volatile storage elements. Examples of such non-volatile storage elements can include magnetic hard discs, optical discs, floppy discs, flash memories, or forms of electrically programmable memories (EPROM) or electrically erasable and programmable memories (EEPROM). In addition, the memory 1306 can, in some examples, be considered a non-transitory storage medium. The term "non-transitory" can indicate that the storage medium is not embodied in a carrier wave or a propagated signal. However, the term "non-transitory" should not be interpreted that the memory 1306 is non-movable. In some examples, the memory 1306 can be configured to store larger amounts of information than the memory. In certain examples, a non-transitory storage medium can store data that can, over time, change (e.g., in Random Access Memory (RAM) or cache). The transceiver 1308 can be configured for communicating internally between the units and externally with the networks. Further, the transceiver 1308 is configured to transmit the LRA to the UE 102.

The FIG. 13 shows a limited overview of the UE 102 but, it is to be understood that other embodiments are not limited thereto. Further, the UE 102 can include any number of units along with other hardware or software components communicating with each other. For example, the component can be, but not limited to, a process running in the controller or processor, an object, an executable process, a thread of execution, a program, or a computer. By way of illustration, both an application running on a device and the device itself can be a component.

Figure 14:
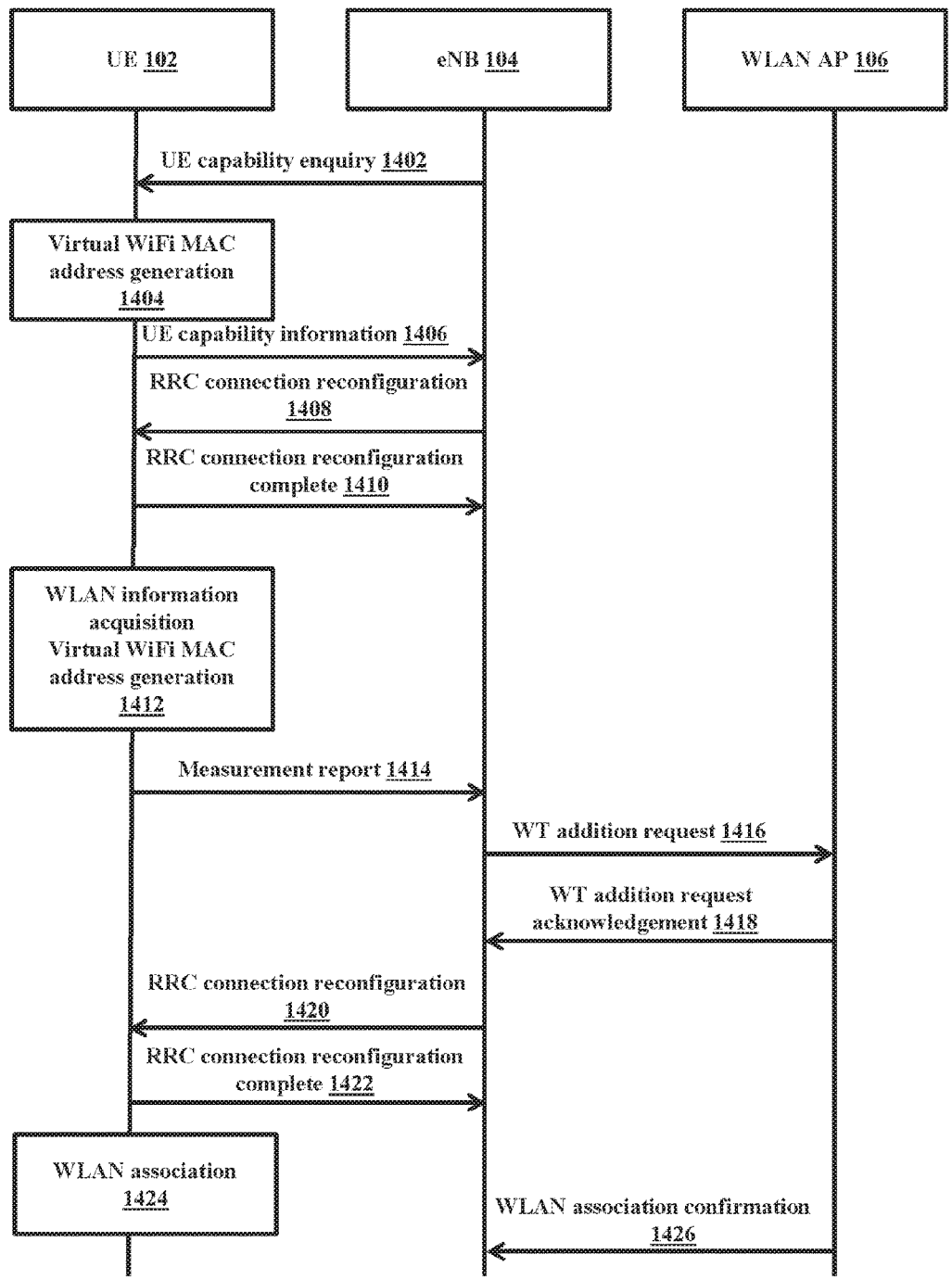
FIG. 14 is a sequence diagram illustrating a step by step process for managing privacy of the user in the network by the UE 102, according to an embodiment as disclosed herein.

FIG. 14 is a sequence diagram illustrating a step by step process for managing privacy of the user in the network by the UE 102, according to an embodiment as disclosed herein. The UE 102 receives (1402) a message (e.g., UE Capability Enquiry message) for enquiring capability of the UE 102 from the eNB 104. After receiving the UE Capability Enquiry message, the UE 102 generates (1404) the LRA, wherein at least one portion of the LRA is randomly generated based on at least one of the network pseudonym identity and the network parameter. The LRA is explained in conjunction with FIGS. 8a-8f.

The UE 102 sends (1406) capability information, including the LRA, to the eNB 104 in reference to the UE Capability Enquiry message. After receiving the capability information from the UE 102, the eNB 104 sends (1408) RRC connection reconfiguration message to the UE 102. After receiving the RRC connection reconfiguration message, the UE 102 sends (1410) RRC connection reconfiguration complete message to the eNB 104.

The UE 102 acquires WLAN/WT information and generates (1412) another LRA correspondence to the WLAN/WT information. The UE 102 sends (1414) measurement report, including the LRA correspondence to the WLAN/WT information, to eNB 104. The eNB 104 sends (1416) the WT addition request, including the LRA correspondence to the WLAN/WT information, to the WLAN/WT 106.

The eNB 104 receives (1418) WT addition request acknowledgement correspondence to the WT addition request. The UE 102 receives (1420) RRC connection reconfiguration message from the eNB 104. The UE 102 sends (1422) RRC connection reconfiguration complete message to the eNB 104. Further, WLAN association is initiated (1424) at the UE 102. The WLAN AP 106 sends (1426) a WT association confirmation to the eNB 104.

The various actions, acts, blocks, steps, or the like in the sequence diagram can be performed in the order presented, in a different order or simultaneously. Further, in some embodiments, some of the actions, acts, blocks, steps, or the like can be omitted, added, modified, skipped, or the like without departing from the scope of the disclosure.

Figure 15:
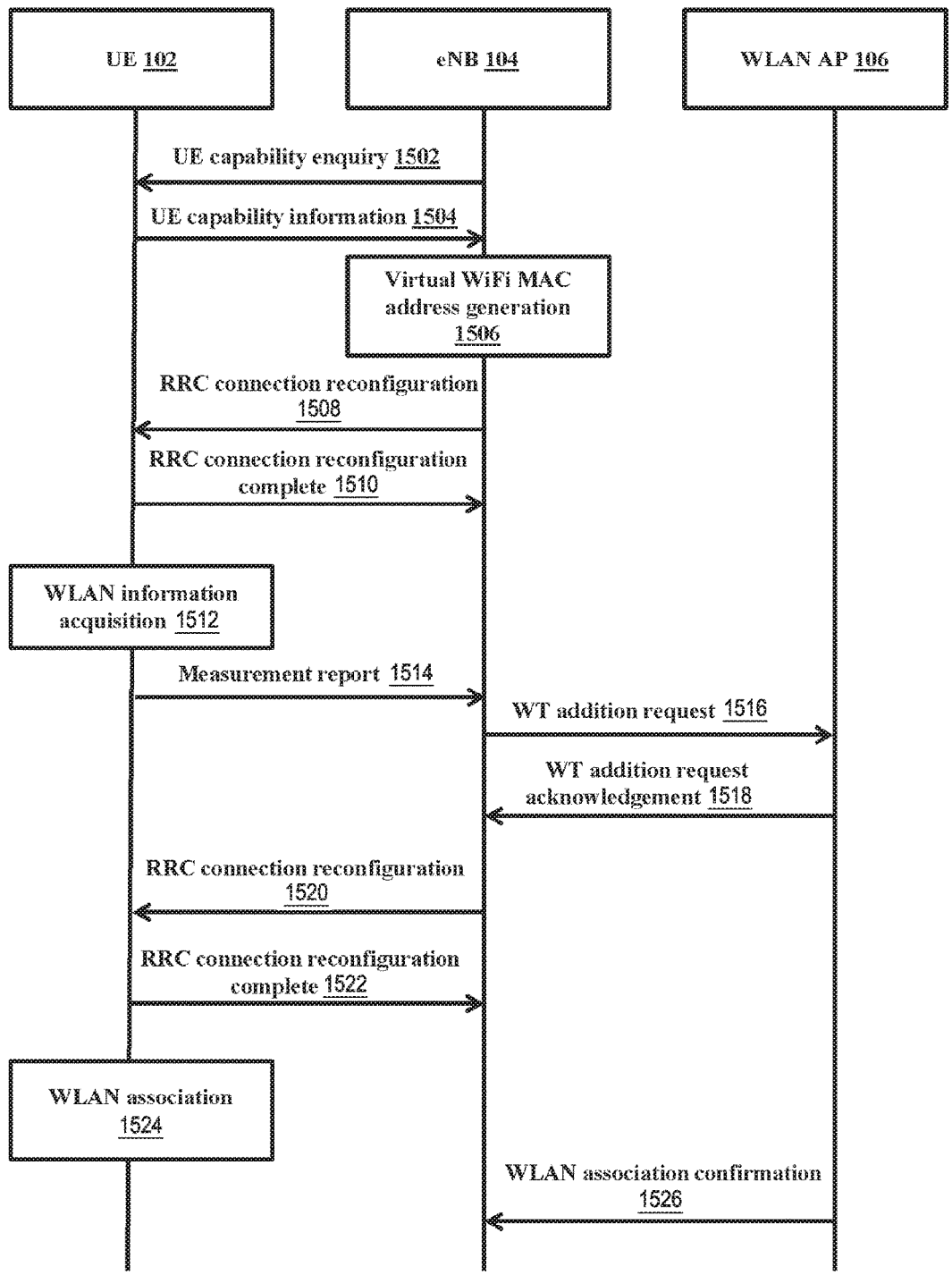
FIG. 15 is a sequence diagram illustrating a step by step process for managing privacy of the user in the network by an eNB, according to an embodiment as disclosed herein.

FIG. 15 is a sequence diagram illustrating a step by step process for managing privacy of the user in the network by the eNB 104, according to an embodiment as disclosed herein. The eNB 104 sends (1502) the UE Capability Enquiry message to the UE 102. The eNB 104 receives (1504) the UE capability information from the UE 102. After receiving the UE capability information from the UE 102, the eNB 104 generates (1506) the LRA. The eNB 104 sends (1508) RRC connection reconfiguration message, including the LRA, to the UE 102. The eNB 104 receives (1510) RRC connection reconfiguration complete message from the UE 102. The UE 102 acquires (1512) the WLAN/WT information. The eNB 104 receives (1514) measurement reports from the UE 102. The eNB 104 sends (1516) the WT addition request, including the LRA, to the WLAN/WT 106. The eNB 104 receives (1518) the WT addition request Acknowledge message. The eNB 104 sends (1520) the RRC connection reconfiguration message to the UE 102. The eNB 104 receives (1522) the RRC connection reconfiguration complete message from the UE 102. The UE 102 initiates (1524) the WLAN association procedure. The eNB 104 receives (1526) the WT association confirmation.

Figure 16:
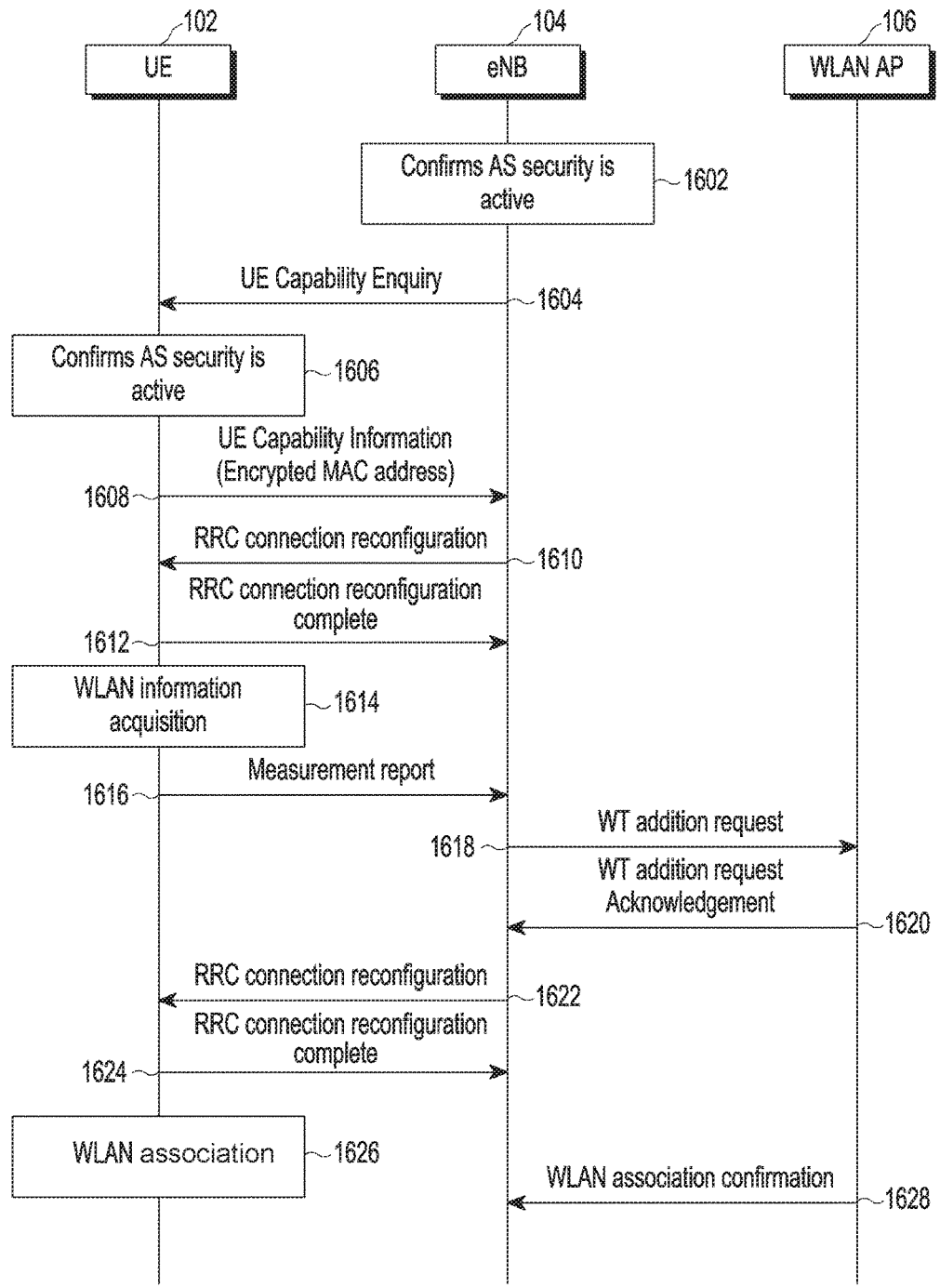
FIG. 16 is a sequence diagram illustrating a step by step process for managing privacy of a user in a network by transmitting an encrypted LRA from a UE to an eNB, according to an embodiment as disclosed herein.

The various actions, acts, blocks, steps, or the like in the sequence diagram can be performed in the order presented, in a different order or simultaneously. Further, in some embodiments, some of the actions, acts, blocks, steps, or the like can be omitted, added, modified, skipped, or the like without departing from the scope of the disclosure FIG. 16 is a sequence diagram illustrating a step by step process for managing privacy of the user in the network by transmitting an encrypted LRA from UE 102 to the eNB 104, according to an embodiment as disclosed herein. The eNB 104 confirms (1602) Access Stratum (AS) security is active. The eNB 104 sends (1604) the UE capability enquiry to the UE 102. The UE 102 confirms (1606) the AS security is active. The UE 102 sends (1608) UE capability information, including an encrypted WLAN MAC address to the eNB 104. Further, the UE 102 receives (1610) RRC connection reconfiguration message from the eNB 104. Further, the UE 102 sends (1612) RRC connection reconfiguration complete message to the eNB 104. Further, the UE 102 performs (1614) WLAN information acquisition. The UE 102 sends (1616) the measurement report to the eNB 104. The eNB 104 sends (1618) the WT addition request to the WLAN AP 106. The eNB 104 receives (1620) WT addition request Acknowledgement from the WLAN AP 106. The eNB 104 sends (1622) the RRC connection reconfiguration message to the UE 102. The eNB 104 receives (1624) the RRC connection reconfiguration complete message from the UE 102. The UE 102 initiates (1626) the WLAN association procedure. The eNB 104 receives (1628) the WLAN association confirmation from the WLAN AP 106.

Figure 17:
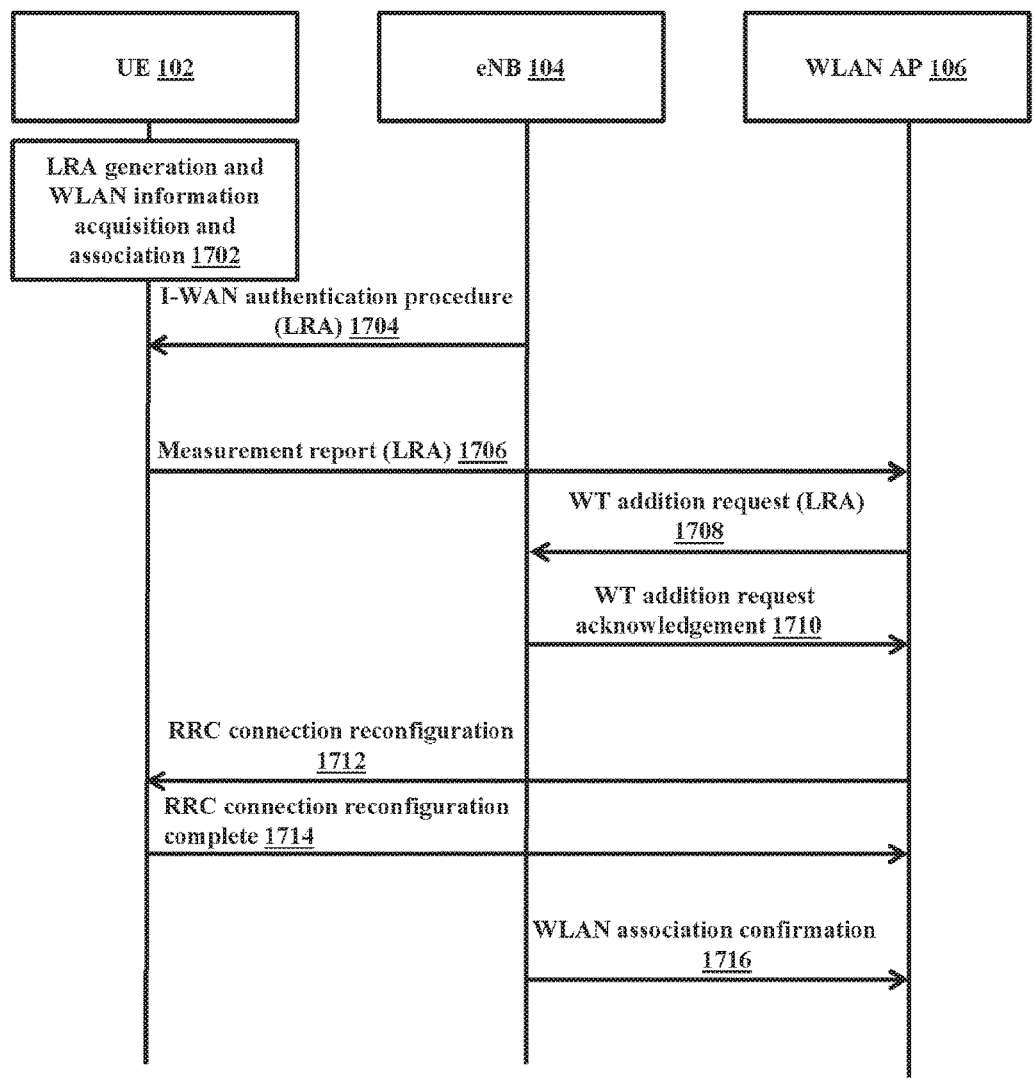
FIG. 17 is a sequence diagram illustrating a step by step process for generating dynamic MAC address by a UE using LTE Parameters when performing interworking WLAN authentication procedure; according to an embodiment as disclosed herein.

FIG. 17 is a sequence diagram illustrating a step by step process for generating dynamic MAC address by the UE 102 using LTE Parameters when performing interworking WLAN authentication procedure; according to an embodiment as disclosed herein. The UE 102 performs (1702) LRA generation and WLAN information acquisition and association. The UE 102 receives (1704) intelligent WAN (I-WAN) authentication procedure. The UE 102 sends (1706) Measurement Report, including the LRA, to the WLAN AP 106. The WLAN AP 106 sends (1708) WT addition request, including the LRA to the eNB 104.

The WLAN AP 106 receives (1710) the WT addition request Acknowledgement from the eNB 104. The WLAN AP 106 sends (1712) the RRC connection reconfiguration message to the UE 102. The WLAN AP 106 receives (1714) RRC connection reconfiguration complete message from the UE 102. The eNB 104 sends (1716) a WLAN association confirmation message to the WLAN AP 106.

The various actions, acts, blocks, steps, or the like in the sequence diagram can be performed in the order presented, in a different order or simultaneously. Further, in some embodiments, some of the actions, acts, blocks, steps, or the like can be omitted, added, modified, skipped, or the like without departing from the scope of the disclosure.

Figure 18:
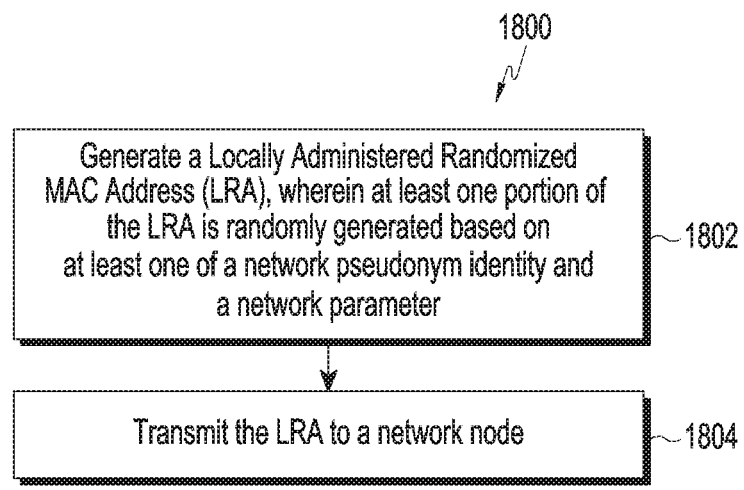
FIG. 18 is a flowchart illustrating a method for managing privacy of a user in a network by a UE, according to an embodiment as disclosed herein.

FIG. 18 is a flowchart 1800 illustrating a method for managing privacy of the user in the network by the UE 102, according to an embodiment as disclosed herein. At step 1802, the method includes generating the LRA, wherein at least one portion of the LRA is randomly generated based on at least one of the network pseudonym identity and the network parameter. The method allows the UE 102 to generate the LRA.

At step 1804, the method includes transmitting the LRA to the eNB 104. The method allows the UE 102 to transmit the LRA to the eNB 104.

The various actions, acts, blocks, steps, or the like in the flowchart 1800 can be performed in the order presented, in a different order or simultaneously. Further, in some embodiments, some of the actions, acts, blocks, steps, or the like can be omitted, added, modified, skipped, or the like without departing from the scope of the disclosure.

Figure 19:
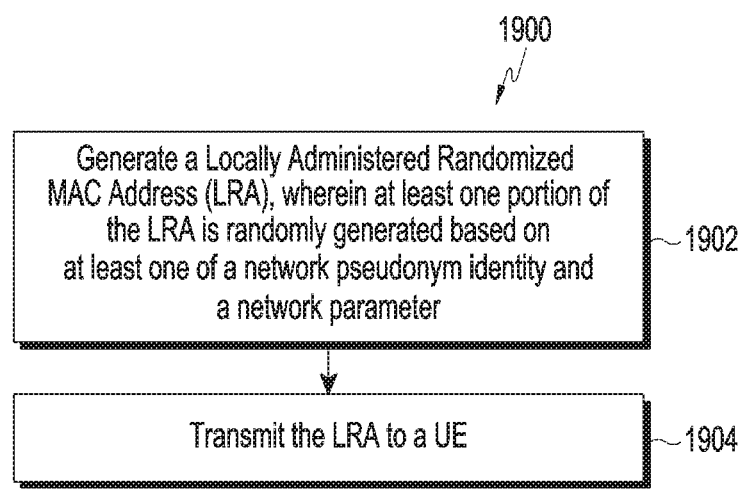
FIG. 19 is a flowchart illustrating a method for managing privacy of a user in a network by an eNB, according to an embodiment as disclosed herein.

FIG. 19 is a flowchart illustrating a method for managing privacy of the user in the network by eNB 104, according to an embodiment as disclosed herein. At step 1902, the method includes generating the LRA, wherein at least one portion of the LRA is randomly generated based on at least one of the network pseudonym identity and the network parameter. The method allows the eNB 104 to generate the LRA.

At step 1904, the method includes transmitting the LRA to the UE 102. The method allows the eNB 104 to transmit the LRA to the UE 102.

The various actions, acts, blocks, steps, or the like in the flowchart 1900 can be performed in the order presented, in a different order or simultaneously. Further, in some embodiments, some of the actions, acts, blocks, steps, or the like can be omitted, added, modified, skipped, or the like without departing from the scope of the disclosure.

FIG. 20 illustrates a computing environment implementing the method and system for managing privacy of the user in a network, according to an embodiment as disclosed herein. As depicted in the FIG. 20, the computing environment 2002 comprises at least one processing unit 2016 that is equipped with a control unit 2004 and an Arithmetic Logic Unit (ALU) 2008, a memory 2012, a storage unit 2014, plurality of networking devices 2006 and a plurality Input output (I/O) devices 2010. The processing unit 2016 is responsible for processing the instructions of the schemes. The processing unit 2016 receives commands from the control unit 2004 in order to perform its processing. Further, any logical and arithmetic operations involved in the execution of the instructions are computed with the help of the ALU 2008.

The overall computing environment 2002 can be composed of multiple homogeneous or heterogeneous cores, multiple CPUs of different kinds, special media and other accelerators. The processing unit 2016 is responsible for processing the instructions of the schemes. Further, the plurality of processing units 2016 can be located on a single chip or over multiple chips.

The scheme comprising of instructions and codes required for the implementation are stored in either the memory unit 2012 or the storage 2014 or both. At the time of execution, the instructions can be fetched from the corresponding memory 2012 or storage 2014, and executed by the processing unit 2016.

Further, storage 2014 can include non-volatile storage elements. Examples of such non-volatile storage elements can include magnetic hard discs, optical discs, floppy discs, flash memories, or forms of electrically programmable memories (EPROM) or electrically erasable and programmable memories (EEPROM). In addition, the storage 2014 can, in some examples, be considered a non-transitory storage medium. The term "non-transitory" can indicate that the storage medium is not embodied in a carrier wave or a propagated signal. However, the term "non-transitory" should not be interpreted that the storage 2014 is non-movable. In some examples, the storage 2014 can be configured to store larger amounts of information than the memory. In certain examples, a non-transitory storage medium can store data that can, over time, change (e.g., in Random Access Memory (RAM) or cache).

In case of any hardware implementations various networking devices 2006 or external I/O devices 2010 can be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 20 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for interworking with an evolved node B (eNB) and a wireless local area network (WLAN) access point (AP) by a user equipment (UE), the method comprising:

receiving a UE capability enquiry message from the eNB;
generating a locally administered randomized WLAN media access control (MAC) address (LRA) based on the UE capability enquiry message, wherein at least one portion of the LRA is generated based on a network temporary identity assigned to the UE by the eNB;
transmitting, to the eNB, the LRA;
receiving a Radio Resource Control (RRC) connection reconfiguration message from the eNB to initiate a WLAN association procedure;
transmitting a RRC connection reconfiguration complete message to the eNB;
initiating the WLAN association procedure with the WLAN AP by using the LRA; and
generating a new LRA in a case that the network temporary identity is changed,
wherein the network temporary identity comprises a cell radio network temporary identity (C-RNTI) or a parameter of a globally unique temporary identity (GUTI).

2. The method of claim 1, wherein the LRA is further comprising one of a cell identity (Cell ID), a random number, or an extensible authentication protocol (EAP) identity.

3. The method of claim 1, wherein the network temporary identity is used for authorized tracking and identification of the UE by the eNB.

4. The method of claim 1, wherein the LRA and an universally administered WLAN MAC address originally assigned to a wireless interface in the UE are distinguished by setting a second-least significant bit of a most significant byte of an address.

5. The method of claim 1, wherein the LRA is generated based on a part of the GUTI, and
wherein the part of the GUTI is a mobile network code (MNC) and a mobility management entity (MME) temporary mobile subscriber identity (M-TMSI).

6. The method of claim 1, wherein initiating the WLAN association procedure with the WLAN AP comprising:
initiating the WLAN association procedure with the WLAN AP with the WLAN AP by using the LRA and a security key,
wherein the security key is computed from an access stratum (AS) security context established between the UE and the eNB.

7. A method for interworking with an evolved node B (eNB) and a wireless local area network (WLAN) access point (AP) by the eNB, the method comprising:
transmitting a UE capability enquiry message to a User Equipment (UE);
receiving, by the eNB, a locally administered randomized WLAN media access control (MAC) address (LRA) based on the UE capability enquiry message, wherein at least one portion of the LRA is generated based on a network temporary identity assigned to the UE by the eNB;
transmitting a WLAN Termination (WT) addition request message including the LRA to the WLAN AP;
receiving a WT addition request acknowledgement message from the WLAN AP;
transmitting a Radio Resource Control (RRC) connection reconfiguration message, to the UE, to initiate a WLAN association procedure;
receiving a RRC connection reconfiguration complete message from the UE;
receiving, from the WLAN AP, a WLAN association confirmation message in a case that the UE performs WLAN association procedure by using the LRA; and
receiving a new LRA in a case that the network temporary identity is changed,
wherein the network temporary identity comprises a cell radio network temporary identity (C-RNTI) or a parameter of a globally unique temporary identity (GUTI).

8. The method of claim 7, wherein the LRA is further comprising one of a cell identity (Cell ID), a random number, or an extensible authentication protocol (EAP) identity.

9. The method of claim 7, wherein the network temporary identity is used for authorized tracking and identification of the UE by the eNB.

10. The method of claim 7, wherein the LRA and an universally administered WLAN MAC address originally assigned to a wireless interface in the UE are distinguished by setting a second-least significant bit of a most significant byte of an address.

11. The method of claim 7, wherein the LRA is generated based on a part of the GUTI, and
wherein the part of the GUTI is a mobile network code (MNC) and a mobility management entity (MME) temporary mobile subscriber identity (M-TMSI).

12. The method of claim 7, wherein the WLAN association procedure is initiated by using the LRA and a security key, and
wherein the security key is computed from an access stratum (AS) security context established between the UE and the eNB.

13. A user equipment (UE) for interworking with an evolved node B (eNB) and wireless local area network (WLAN) access point (AP), the UE comprising:

a transceiver; and
a processor, coupled with the transceiver, and configured to:
control the transceiver to receive a UE capability enquiry message from the eNB,
generate a locally administered randomized WLAN media access control (MAC) address (LRA) based on the UE capability enquiry message, wherein at least one portion of the LRA is generated based on a network temporary identity assigned to the UE by the eNB,
control the transceiver to transmit, to the eNB, the LRA,
control the transceiver to receive a Radio Resource Control (RRC) connection reconfiguration message from the eNB to initiate a WLAN association procedure,
control the transceiver to transmit a RRC connection reconfiguration complete message to the eNB,
initiate the WLAN association procedure with the WLAN AP by using the LRA; and
generate a new LRA in a case that the network temporary identity is changed,
and
wherein the network temporary identity comprises a cell radio network temporary identity (C-RNTI) or a parameter of a globally unique temporary identity (GUTI).

14. The UE of claim 13, wherein the LRA is further comprising one of a cell identity (Cell ID), a random number, or an extensible authentication protocol (EAP) identity.

15. The UE of claim 13, wherein the network temporary identity is used for authorized tracking and identification of the UE by the eNB.

16. The UE of claim 13, wherein the LRA and an universally administered WLAN MAC address originally assigned to a wireless interface in the UE are distinguished by setting a second-least significant bit of a most significant byte of an address.

17. An evolved node B (eNB) for interworking with a wireless local area network (WLAN) access point (AP), the eNB comprising:
a transceiver; and
a processor, coupled with the transceiver, and configured to:
control the transceiver to transmit a User Equipment (UE) capability enquiry message to a UE;
control the transceiver to receive, by the eNB, a locally administered randomized WLAN media access control (MAC) address (LRA) based on the UE capability enquiry message, wherein at least one portion of the LRA is generated based on a network temporary identity assigned to the UE by the eNB;
control the transceiver to transmit a WLAN Termination (WT) addition request message including the LRA to the WLAN AP;
control the transceiver to receive a WT addition request acknowledgement message from the WLAN AP;
control the transceiver to transmit a Radio Resource Control (RRC) connection reconfiguration message, to the UE, to initiate a WLAN association procedure;
control the transceiver to receive a RRC connection reconfiguration complete message from the UE;
control the transceiver to receive, from the WLAN AP, a WLAN association confirmation message in a case that the UE performs WLAN association procedure by using the LRA; and
control the transceiver to receive a new LRA in a case that the network temporary identity is changed,
and wherein the network temporary identity comprises a cell radio network temporary identity (C-RNTI) or a parameter of a globally unique temporary identity (GUTI).

18. The eNB of claim 17, wherein the LRA is further comprising one of a cell identity (Cell ID), a random number, or an extensible authentication protocol (EAP) identity.

19. The eNB of claim 17, wherein the network temporary identity is used for authorized tracking and identification of the UE by the eNB.

20. The eNB of claim 17, wherein the LRA and an universally administered WLAN MAC address originally assigned to a wireless interface in the UE are distinguished by setting a second-least significant bit of a most significant byte of an address.

* * * * *